United States Patent [19]

Currier, Jr.

[11] Patent Number: 4,651,298
[45] Date of Patent: Mar. 17, 1987

[54] SELECTION OF DATA FROM BUSSES FOR TEST

[75] Inventor: John L. Currier, Jr., Annapolis, Md.

[73] Assignee: The United States of America as represented by the Secretary of the Air Force, Washington, D.C.

[21] Appl. No.: 615,503

[22] Filed: May 30, 1984

[51] Int. Cl.$^4$ .................. G06F 15/00; G06F 11/30
[52] U.S. Cl. ..................... 364/900; 371/16; 371/20
[58] Field of Search ... 364/200 MS File, 900 MS File; 371/16, 20

[56] References Cited

U.S. PATENT DOCUMENTS

| 4,100,532 | 7/1978 | Farnbach | 364/481 |
| 4,425,643 | 1/1984 | Chapman et al. | 371/20 |
| 4,517,671 | 5/1985 | Lewis | 371/16 X |
| 4,554,632 | 11/1985 | Nygaard, Jr. et al. | 364/300 |
| 4,601,033 | 7/1986 | Whelan | 371/25 |

Primary Examiner—Raulfe B. Zache
Assistant Examiner—Thomas C. Lee
Attorney, Agent, or Firm—Bernard E. Franz; Donald J. Singer

[57] ABSTRACT

A test computer has a direct memory access module, interface units, and a data select unit for each of several system busses. Only some of the data on each system buss is to be transferred to the direct memory access module. The data is organized with a command or header word which may be followed by a number of data words. The principle is to first check the command word to see if any data items are desired from the particular transfer, and if they are to check the position of each data item to see if it is desired. The data select unit includes a select memory, a position counter, and a position memory. During a load mode information from the test computer is loaded into the memories and counter to designate what data is to be transferred from the system buss. During a run mode, input control circuits of a bus interface unit selects and supplies the command word to the data control unit to address the select memory, which indicates what items are to be transfered. A yes/no bit is read from the position memory for each position to determine if the data word is to be transferred, the position counter being incremented for the succesive positions. If an ALL bit was set, all data following a command word is transfered until the next command word.

8 Claims, 16 Drawing Figures

SELECTION OF DATA FROM BUSSES FOR TEST

RIGHTS OF THE GOVERNMENT

The invention described herein may be manufactured and used by or for the Government of the United States for all governmental purposes without the payment of any royalty.

BACKGROUND OF THE INVENTION

This invention relates to a universal data select unit for selecting data from a number of busses of different format for analysis by a test computer and at a test bench.

The prior art includes U.S. Pat. No. 4,217,580 to Lowenschuss which discloses an electronic countermeasure system wherein a signal processing circuit is included to enable only a predetermined number of digital words associated with one of a plurality of radio frequency energy sources to pass to a general purpose computer. U.S. Pat. No. 3,975,730 to Maeda et al discloses radar data selection equipment which includes a gate disposal between a target data detector and a computer capable of inhibiting the output of specific signals among the data from the radar.

Many present day aircraft radars use several serial duplex busses for communication with the various radar and system units. Being major information points, these busses are always instrumented (recorded) during flight test and are normally monitored if possible during bench test.

The normal transfer on these busses starts with a command word which may or may not totally define the information to follow. The information following the command word depends on the buss, it can be a single data word, a fixed number of data words, or a variable number of words depending on the particular data being transferred.

During reduction of the flight test data, it is normally desired to only process a limited number of the possible parameters from the various busses during a single run. This occurs due to the particular type of processing being performed and a limited hardcopy capability. Even though the reduction computer is only interested in some of the parameters, it must accept all and search the information for the desired ones increasing the processing time. This requires the flight data to be played back at a slower rate increasing the reduction time. As many runs are normally made from a single flight, this increase in time becomes very significant.

During bench test, the same problem is encountered, but the controlling bench computer does not normally have the available processing time to handle this data as it must be done in real time. Normally this is solved by adding monitoring circuitry which feeds some type of output device for display. This circuitry requires indentical hardware for each signal it desires to monitor, plus only provides a very limited capability as it can normally only monitor the single word or fixed length transfers. This also fixes the number of signals which can be monitored at any one time, plus only allows one type of display which may not be the best display for the particular data item.

SUMMARY OF THE INVENTION

An object of the invention is to provide for more efficient selection of data from the busses. According to the invention this is accomplished by the addition of a data selection circuit between the busses, andthe reduction and bench computers. A further object is to provide a data selection circuit which has the capability of selecting any number of desired data items to send to the computers, and which can be configured so that identical and repetitive hardware is not required for each desired data item. It should also be configured so the same circuitry could be used for any of the various busses making it universal, providing a savings in both hardware and software design. This would reduce the reduction time required for flight data, plus reduce the hardware and increase the capability of the test bench.

In the data selection configuration according to the invention, the principle (effective during a run mode) is to first check the command word to see if any data items are desired from the particular transfer, and if they are to check the position of each data item to see if it is desired. In transfers where the command word does not totally define the data, bits are added to the command to identify the message type. Normally this requires 6 to 8 bits which can be added in spare bit positions. When a command word is received, the correct bits per the buss being processed are selected and used as the address for the selection memory.

In a specific embodiment, the command word is limited to 8 bits (256 different commands) as this is considered adequate. Each location of a selection memory contains eleven bits. An enable bit determines if any data is required from the transfer. An ALL bit determines if all the data in the tranfer is desired. An interrupt bit determines if the computer desires an interrupot along with the selected command as a timing or synchronization indication. An eight-bit position address is the starting eight most significant address bits for a position memory where position information is stored if necessary. The position memory is 4K by a single bit which is set if a particular word is desired. Each word received in this transfer increments the position memory to the next address. A part of the position memory is a STOP bit which is only 256 words as each position storage will be done in 16-word groups. Depending on the information obtained from the memories, desired data is transferred to the computer, otherwise it is ignored.

The sequence is to receive a command word which addresses the selection memory. Enable and ALL signals are supplied and a position counter is loaded per the stored information from the selection memory. The enable must be set to transfer any data. If ALL is set, all data until the next command word is transferred. Next a yes/no bit is read from the position memory and used if necessary to determine whether to transfer the item or not. If the item is to be transferred, it is now performed. If a data word is received next, the position address counter is incremented and the new yes/no bit is read from the position memory. This continues until a new command is received or the STOP bit (every 16 words) is read from the position memory.

The programming of the data select is performed by the reduction or test bench computer prior to the desired run, with the data selection unit in a load mode. This is performed by using two words. The first word transferred is the command select word which selects the desired command and stores in its location of the select memory the enable. ALL, interrupt and position address information. A set of bits designated NO. POS. WDS., is a count of the number of position words to be transferred for the particular command select. Note for enable to be set ALL must be set or the NO. POS. WDS. must be greater than zero. Also note that the position address is a relative count determined by the data select. Next, position words will be transferred if so indicated by the NO. POS. WDS. Each position word contains yes/no information for 16 words starting with the command word. These need only include the last selected data word as the STOP bit is stored with the last position word. For each command select 1K positions are available for selection. After the position words are received, the next select word would be transferred and the sequence repeated until the data select is completely loaded.

The invention allows complete flexibility in selecting none, all, or anything between these limits for transfer to the computers. It keeps the hardware to a minimum and can be easily adapted to the reduction facility or test bench.

DETAILED DESCRIPTION

SYSTEM BLOCK DIAGRAM

Figure 1:
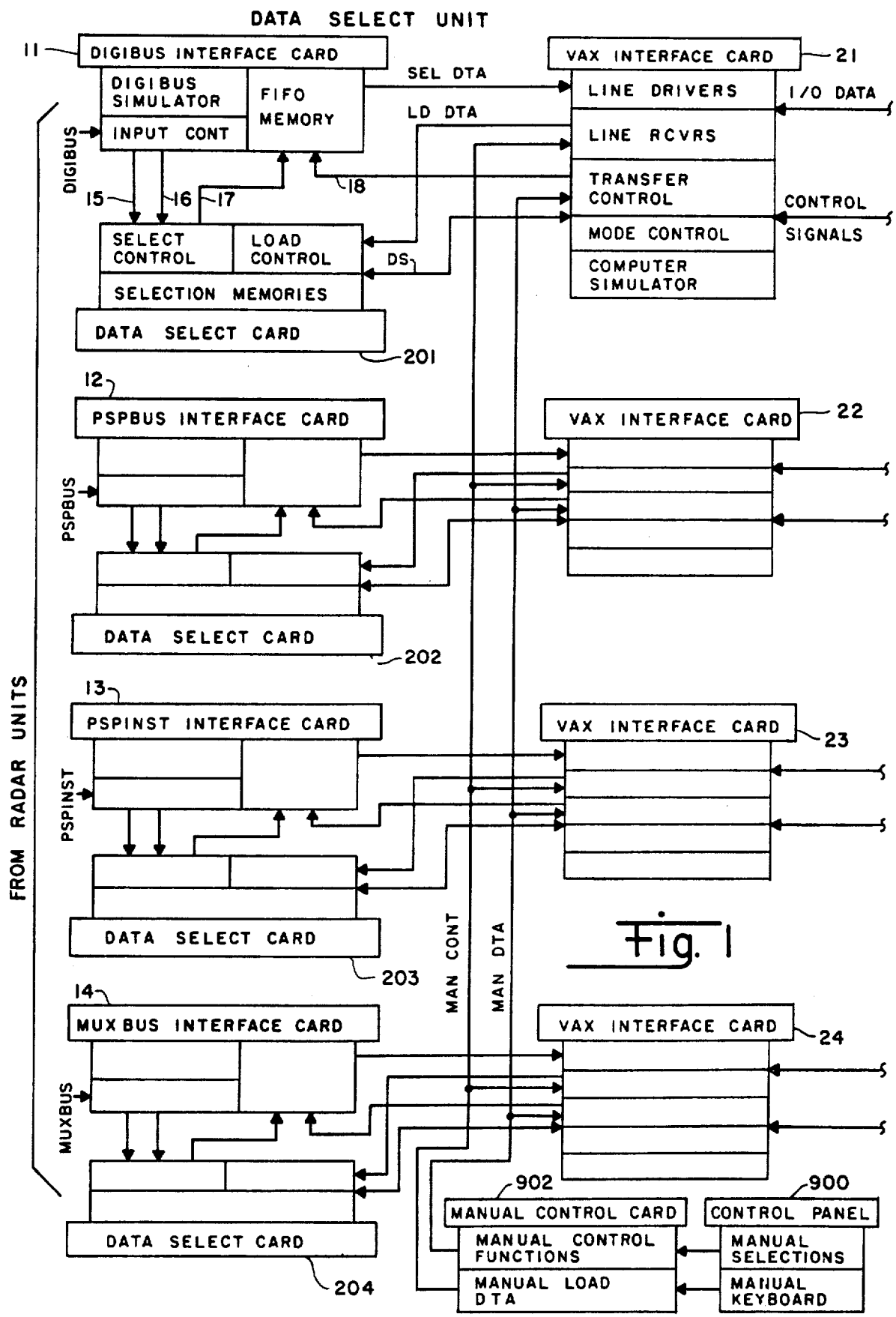
FIGS. 1 and 1A placed together comprise a system block diagram for data selection.
Figure 1A:
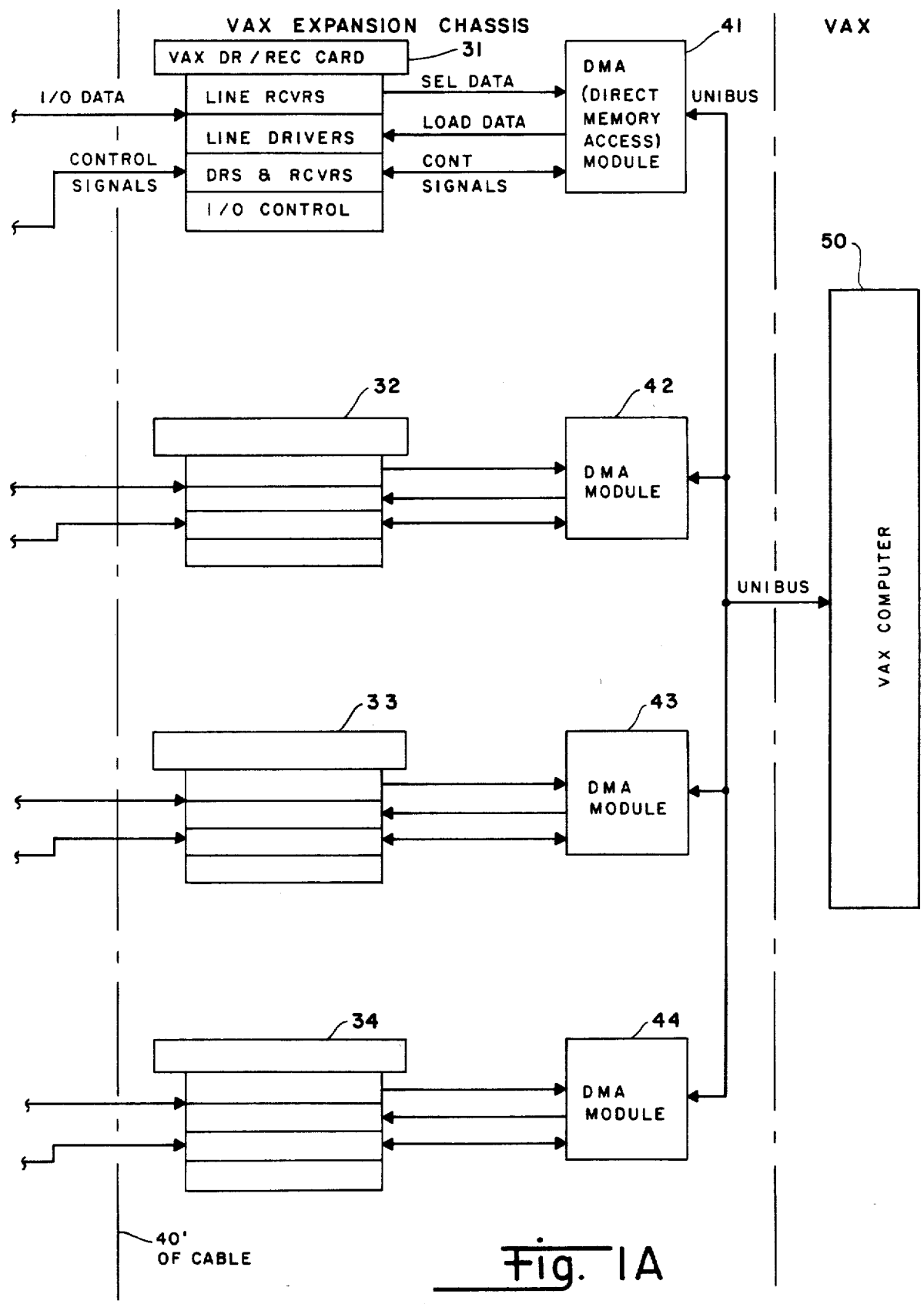

Referring to FIGS. 1 and 1A, there are shown four serial duplex busses from the radar units, designated DIGIBUS, PSPBUS, PSPINST, and MUXBUS. For each of the four busses, there are similar units coupled between it and a VAX computer 50. For example, the DIGIBUS is connected to a DIGIBUS interface card 11, which comprises a DIGIBUS simulator, input control, and a FIFO (first in first out) buffer memory. The FIFO memory allows data to be selected at a different rate than the computer is ready to receive it. A data select card 201 is associated with the DIGIBUS interface card. It comprises select control circuits, load control circuitry, and selection memories. An 8-bit line 15 for the select mode and a 3-bit control line 16, extend from the interface card 11 to the data select card 201. A single bit line 17 extends from the unit 201 to the card 11 to control clocking of selected data into the FIFO memory. The other busses have similar interface cards 12, 13 and 14, and identical data select cards 202, 203 and 204.

A VAX interface card 21 comprises line drivers, line receivers, transfer control circuitry, mode control circuitry, and a computer simulator section. The buss interface card 11 is coupled to the line drivers of the interface card 21 via a 16-bit line SEL DTA. The line receivers of the interface card 21 are connected to the data select card 201 via a 16-bit line LD DTA. The interface card 21 is also connected to the data select card 201 via a multibit control line DS. A one-bit line 18 is connected from the interface car 21 to the bus interface card 11 to control the clocking of data from the FIFO memory to the line SEL DTA. For the other three busses, there are similar VAX interface cards 22, 23 and 24 connected respectively to the bus interface cards 12, 13 and 14; and also respectively to the data select cards 202, 203 and 204.

There is a common natural control card 902 with a control panel 900. The control card 902 is connected via lines MAN CONT and MAN DTA in parallel to all four of the VAX interface cards 21-24.

The VAX interface card 21 is coupled to a VAX driver/receiver card 41 via forty feet of cable including a 16-bit line I/O DTA, and a 16-bit line CONTROL SIGNALS. For the other busses there are similar VAX driver/receiver cards 32, 33 and 34 coupled respectively to the interface cards 22, 23 and 24.

The VAX computer 50 is coupled via a common buss UNIBUS to the four direct memory access modules 41–44. The VAX driver/receiver card 31 is coupled to the direct memory access module 41 via 16-bit lines SEL DTA, LOAD DATA, and CONT SIGNALS. The other three VAX driver/receiver cards 32, 33 and 34 are in like manner coupled respectively to the direct memory access modules 42, 43 and 44.

DATA SELECT UNIT

1.0 PURPOSE

The Data Select Unit provides to the IMP F16 Test Bench Computer in real time, preselected imformation from the various radar busses. This eliminates the impossible real time task of the computer accepting and searching all the information it normally desires. In the following description reference is to the units associated with the bus DIGIBUS, unless otherwise indicated. The units for the other three busses are the same.

2.0 CAPABILITY

The Data Select Unit can provide to the Test Bench Computer any number of preselected words including the possibility of all the words from each of the busses. The only quantity limitation is the ability of the computer to accept the selected data in real time. The busses from which selections can be made are DIGIBUS, PSPBUS, MUXBUS, and PSPINST.

3.0 SELECTION PHILOSOPHY

Selection is based on the principle that each transfer on the busses starts with a command or header word followed by one or more data words. The command word contains up to eight bits which can be used to define the data words which follow by position. Selection is made by defining the command word and the position of the data words that are desired following the command.

3.1 Selection Mechanization

Figure 2:
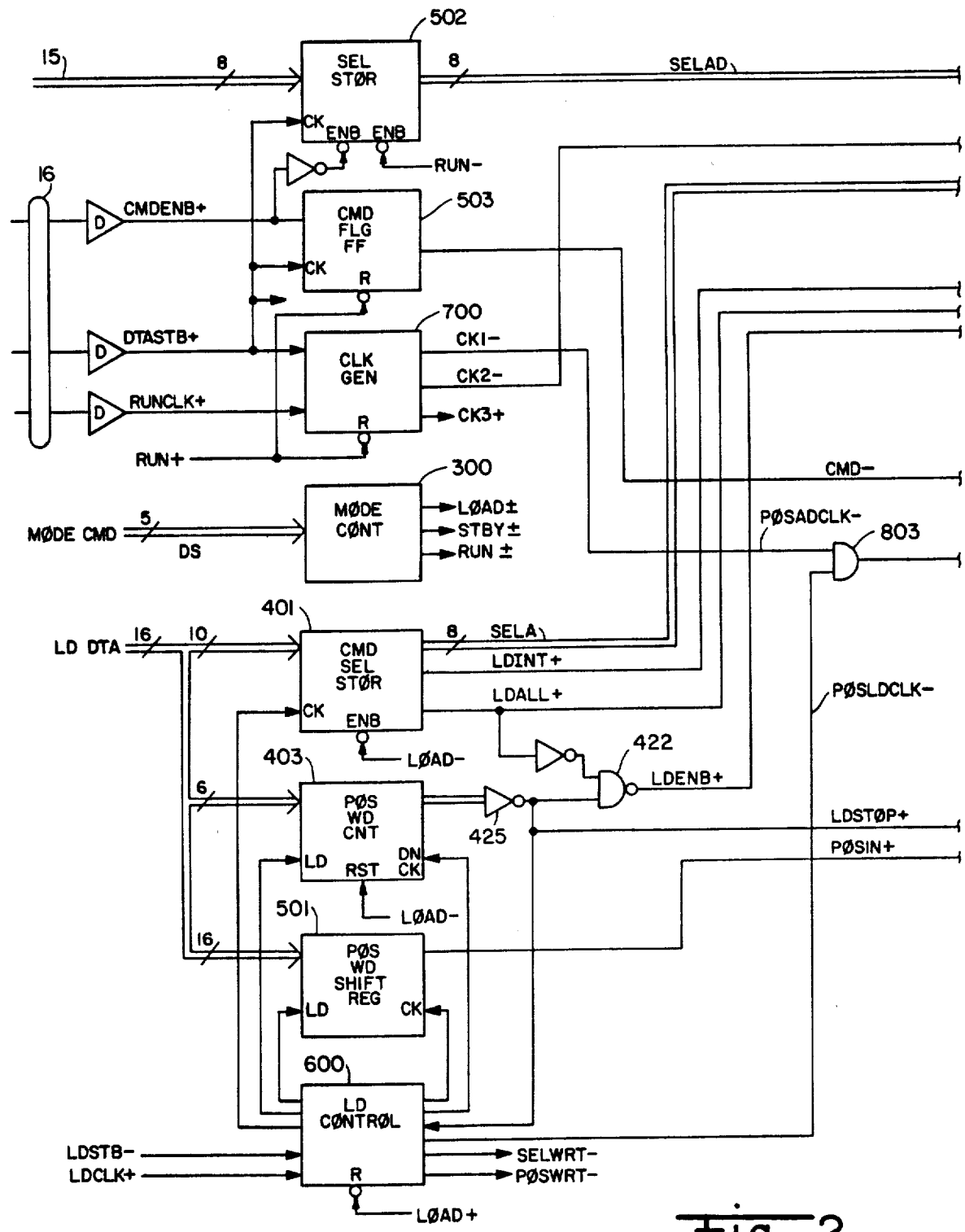
FIGS. 2 and 2A placed together comprise a block diagram of a universal data select unit used in the system.
Figure 2A:
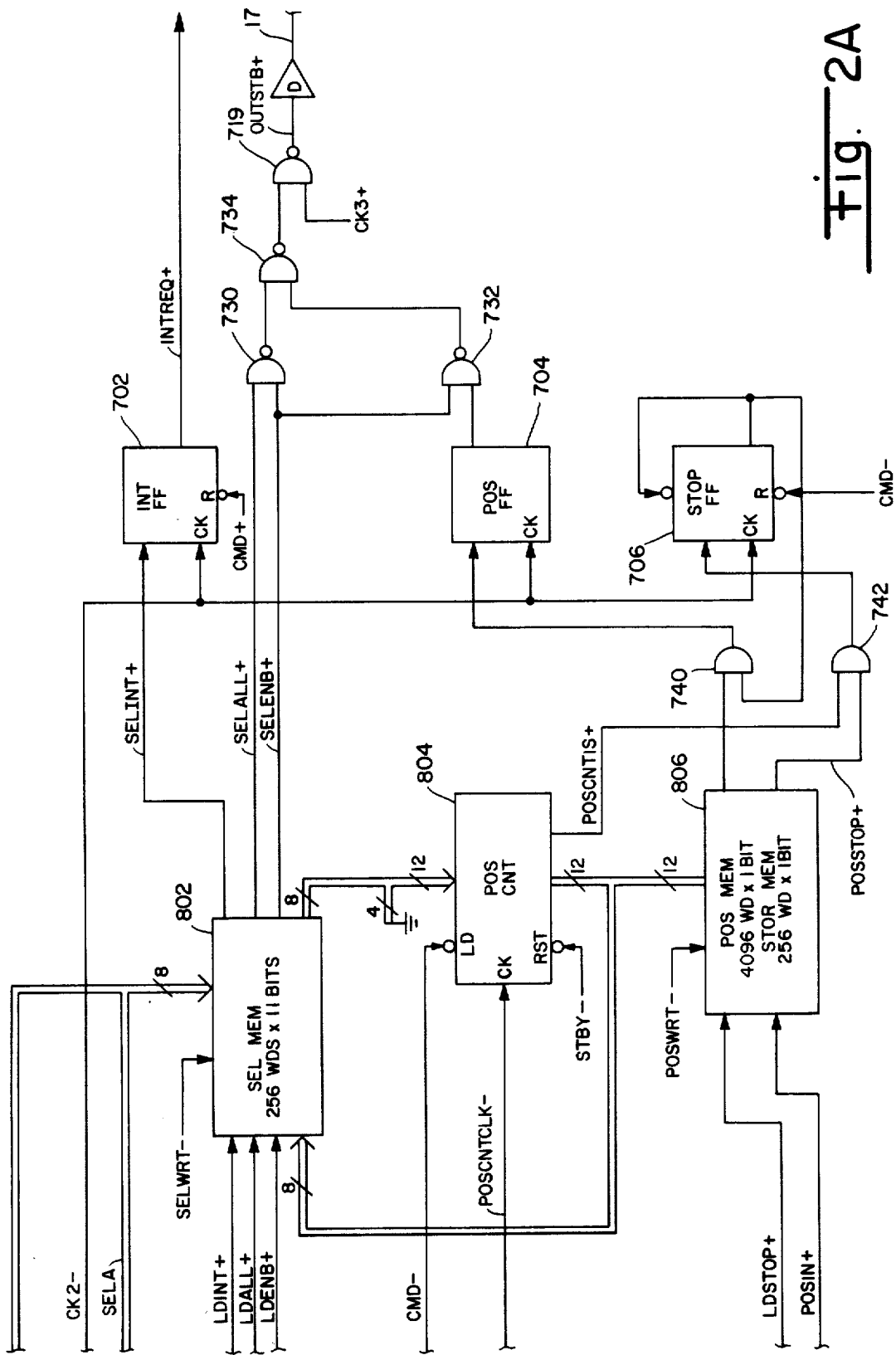

The data select card 201 is shown in a block diagram FIGS. 2 & 2A, with the first digit of each reference character indicating the figure number of the detailed diagram of FIGS. 3-8. It utilizes two memories 802 & 806 for selecting the desired data. These are programmed (in the data select unit load mode) by the Test Bench Computer prior to the data processing.

The first memory 802 is the selection memory which is 256 words by 11 bits. This memory is addressed (in the run mode) by the eight definition bits of the command or header word. Stored in this memory is the necessary information defining if any or all of the data words associated with this command word are desired. If no data is desired, no further action is required until the next command word is received. If all the data is desired, the command word and all the data words received will be sent to the computer until receipt of the next command word. If only certain words are desired, this memory furnishes a starting address for the second memory.

The second memory 806 is the position memory which is 4906 words by 1 bit, along with a second bit which is only 256 words. The primary bit contains yes/no information for each data word associated with a command word by position. The second bit contains a stop bit for every 16 position bits. This bit conserves memory as processing is stopped upon detection of this stop bit. It should be noted that the position memory is programmed using 16-bit increments. As stated above this memory receives its starting address from the selection memory, via a position counter 804. This first position output determines if the command word should be sent to the computer. Upon receipt of the first data word the position address is incremented in the counter 804, and the position memory output determines if this word is desired. This process continues until a stop bit is obtained from the position memory, or until the next command word is received which restarts the entire process.

The data select card 201 also includes a select store 502, a command flag 503, a clock generator 700, a mode control circuit 300, a command select store 401, a position word counter 403, a position word shift register 501, a load control circuit 600 shown on FIG. 2. Also shown in FIG. 2A are an interrupt flip flop 702, a position flip flop 704 and a stop flip flop 706 along with some associated gates.

Most of the logic circuits in FIGS. 3–8 are selected from the 54LS family of compatible TTL integrated circuits. These include 54LS00 NAND gates, 54LS02 NOR gates, 54LS04 inverters, 54LS08 AND gates, 54LS11 AND gates, 54LS20 NAND gates, 54LS74A D-type flip flops, 54LS109 JK-type flip flops, 54LS123 monostable multivibrators, 54LS161A synchronous 4-bit counters, 54LS165 parallel-load 8-bit shift registers, 54LS173 4-bit D-type registers, 54LS193 synchronous up/down clock counters, and 54LS365A bus drivers. The selection memory 802 comprises three 93422DM (like 93L422?) 256×4-bit fully decoded random access TTL isoplanar memory chips. In the position memory 806, the 4906×1-bit chip may be either a type 93471DM, or type D2147H-2 (see Intel 2147H data sheet); and the 256×1-bit chip is type 93421DM.

The leads designated P1 to P15 are connected via fifteen pull-up 1K resistors to a +5-volt source. The drivers (shown as a D in a triangle), are IC's which have pins 1 & 15 grounded, and are therefore always enabled.

4.0 OPERATIONAL CONTROL

The Data Select Unit is normally controlled by the computer. It receives from the computer commands which define the desired mode of operation, and sends to the computer status information which define its present condition. It also receives from the computer and sends to the computer control signals which enable the transferring of data both to and from the computer. The data received from the computer is the information required to define the desired selected data. The data sent to the computer is the desired selected data. This data is sent to the computer as it is received, but if necessary, is temporarily stored to allow for computer delays and for data bursts which the computer cannot handle in real time.

A manual secondary control 900–902 is also provided which allows any of the above functions to be controlled by an operator. The basic difference is that the selected data is displayed on a digital readout.

5.0 COMPUTER INTERFACE

Each of the four preselected busses interfaces with the computer via its own direct memory access (DMA) channel and module. This makes each bus appear as a separate data select unit to the computer. This allows for the maximum usage, as some channels can be under computer control while others are under manual control with each in a different mode of operation.

5.1 Command/Status Register

Each computer DMA module contains a command/status register which provides the primary control to the data select unit. It is from this register that the data select unit receives its commands, and it is to this register that the data select unit sends its status. The contents of the register are as follows:

| -ERR-ATN-MAN- | DSTAT | -CYC-RDY- | IE-A17-A16- | FNCT | - GO- |
|---|---|---|---|---|---|
| - 15- 14- 13- | 12- 11- | 10- 09- 08- 07- | 06- 05- 04- | 03- 02- | 01- 00- |
| MSB | | | | | LSB |

Five of these bits are outputs to the data select unit. They are used as follows:

| BIT | NAME | PURPOSE |
|---|---|---|
| 00 | GO | Pulse which defines start of DMA operation by resetting RDY (bit 07). |
| 01 | FNCT1 | Levels which control data select operation. |
| 02 | FNCT2 | |
| 03 | FNCT3 | |
| 07 | RDY | Reset by GO indicating start of DMA operation, set by DMA complete or ERR (bit 15) causing interrupt to computer if IE (bit 06) is set. |

Four of these bits are output from the data select unit. They are used as follows:

| BIT | NAME | PURPOSE |
|---|---|---|
| 09 | DSTATC | Levels which indicate data select status to computer. |
| 10 | DSTATB | |
| 11 | DSTATA | |
| 13 | ATN | Used by data select to set ERR (bit 15) causing interrupt to computer if IE (bit 06) is set. |

The seven remaining bits are not available to the data select unit although two are of interest. They are used as follows:

| BIT | NAME | PURPOSE |
|---|---|---|
| 06 | IE | Interrupt Enable. If set allows setting of RDY (bit 07) to cause an interrupt. |
| 15 | ERR | Error. Is caused to be set by data select by setting ATN (bit 13) or applying a NOLOCK signal to the DMA MODULE. Setting causes RDY (bit 07) to set which causes interrupt if IE (bit 06) is set. |

6.0 MODES

The data select unit has three modes and a fault condition, either under computer or manual control.

6.1 Standby mode

This is a non-operative mode which initializes the data select unit for a load or run operation. It clears any fault and places the unit in a ready or load required state.

6.2 Load Mode

This is an operative mode during which selection requirements are loaded into the data select memories. This mode may only be entered from the standby mode.

6.3 Run Mode

This is an operative mode during which the data meeting the selection requirements are output. This mode may be entered from the load or standby modes providing a load is not required.

6.4 Fault Condition

This is a non-operative condition which indicates that a fault occured. The unit will only go to the standby mode from this condition.

7.0 MODE CONTROL

The data select unit can be placed in any mode by the computer or by manual control. At power-on or computer initialization the unit is automatically connected to the computer and is momentarily issued a simulated standby command. From this initial condition, the unit will only accept a load command, as a load is required due to the power-on sequence. At any time the unit may be placed under manual control which automatically places it in the standby mode. During manual control or power-off, the computer receives a NOLOCK signal which causes it to receive a continuous error indication which it cannot clear by issuing a standby command. When this condition occurs, the computer must wait until NOLOCK is removed thus removing the error indication.

7.1 Computer Mode Control

The computer controls the data select unit by using the function bits of the command/status register of the DMA module. The function of these bits are as follows:

| BIT | NAME | FUNCTION |
|---|---|---|
| 01 | FNCT 1 | LOW = STANDBY, HIGH = OPERATE |
| 02 | FNCT 2 | LOW = LOAD, HIGH = RUN (FNCT 1 MUST BE HIGH) |
| 03 | FNCT 3 | LOW = BUS DATA, HIGH = SIMULATED DATA (FNCT 1 MUST BE LOW FOR |

-continued

| BIT | NAME | FUNCTION |
|---|---|---|
| | | CHANGE TO OCCUR) |

7.2 Manual Mode Control

Figure 9:
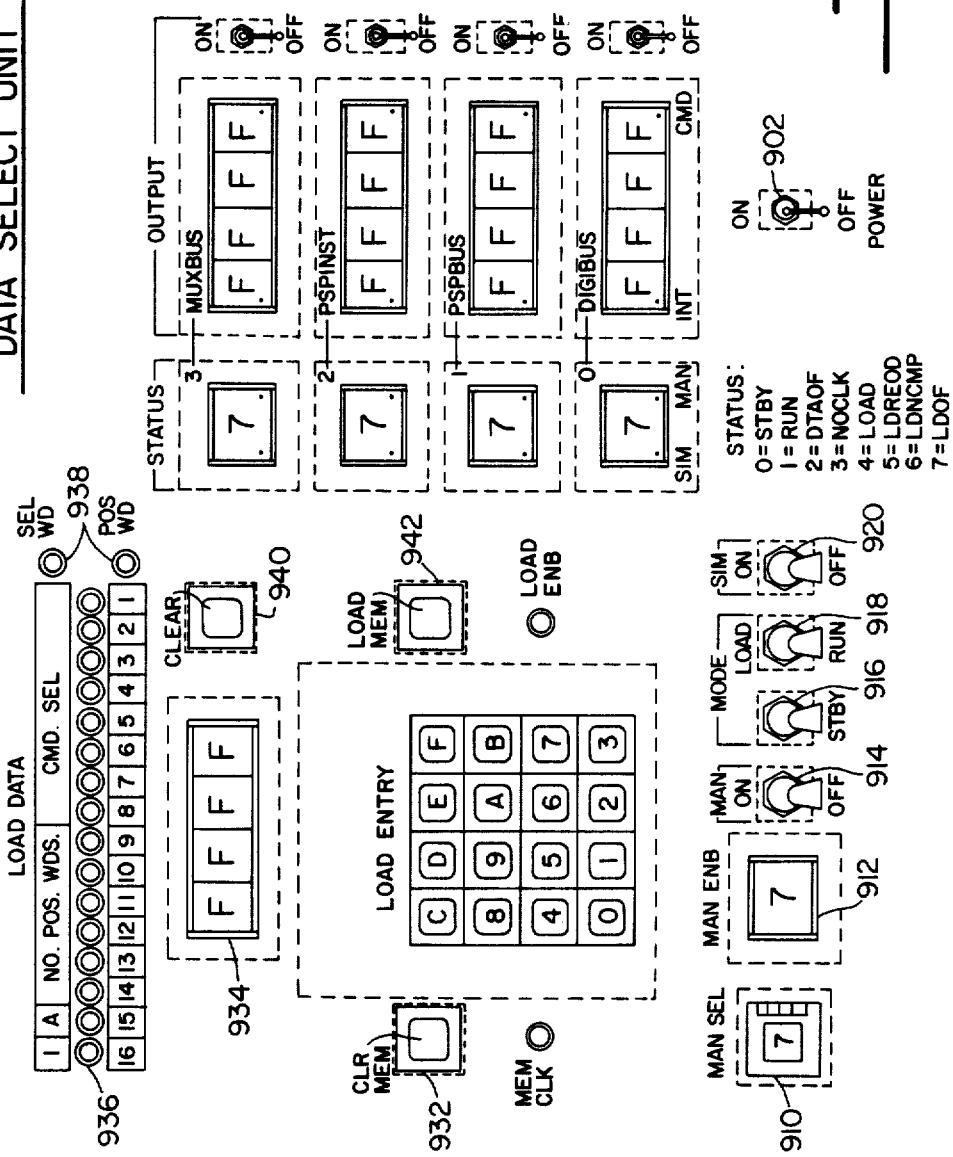
FIG. 9 is a diagram of a manual control panel.

The data select unit mode may be manually controlled by switches on the front panel 900 (FIGS. 1 and 9). First the desired bus must be selected by the selection thumbwheel switch 901, and indicated by the selection enable readout 912. The indicated bus can be put in manual by the momentary manual on/off switch 914. It may then be placed in the desired mode by the momentary standby switch 916, or the momentary run/load switch 918. A new bus cannot be selected as long as the present selected bus is in the load mode. The input data may be from the bus or the simulator as selected by the momentary simulator on/off switch 920. This selection can only be made if the unit is in the standby mode. The unit may be removed from manual control and placed under computer control by the momentary manual on/off switch 914.

Figure 3:
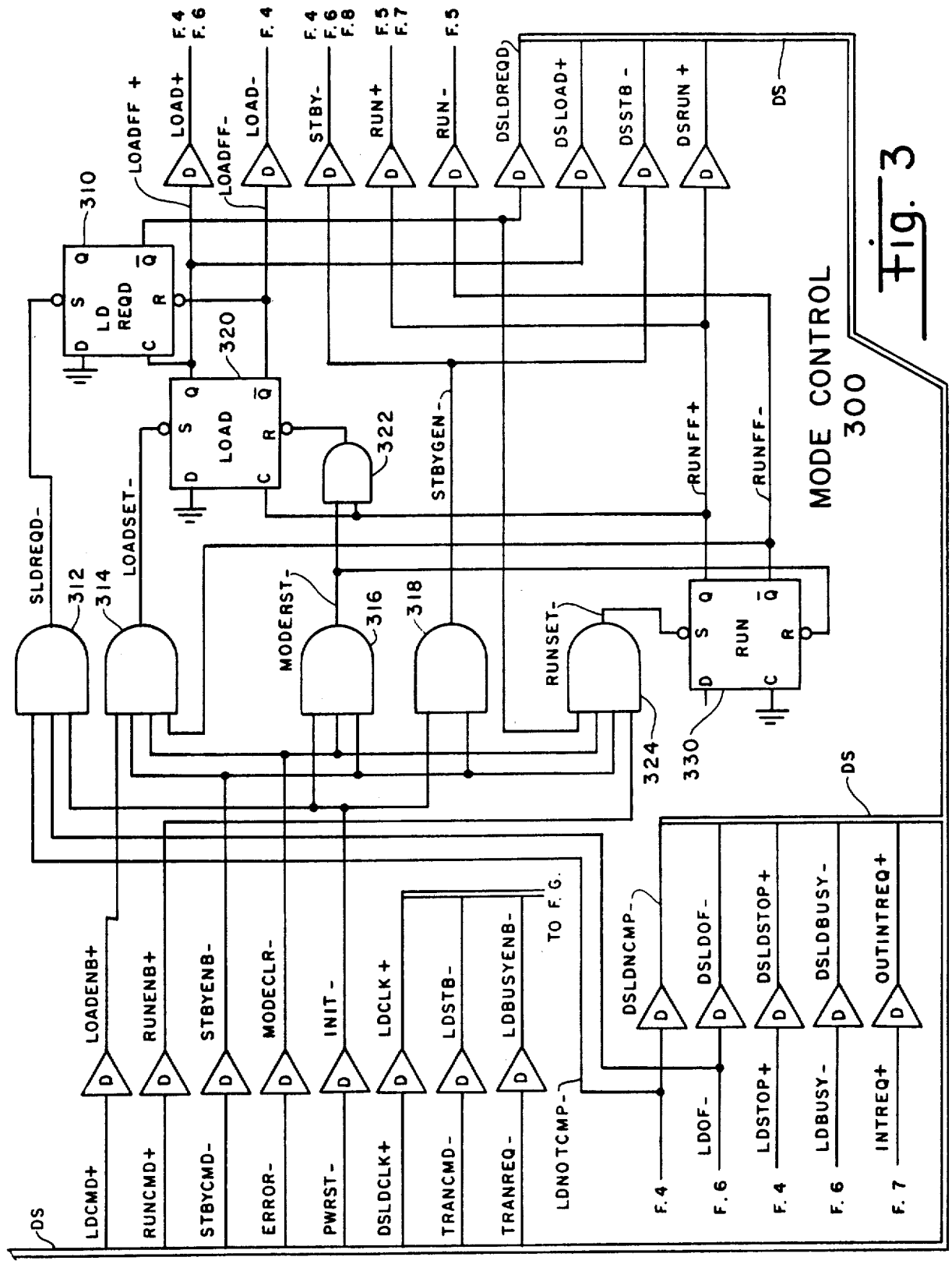
FIGS. 3–8 comprise a detailed functional block diagram of one data select unit.

7.3 Mode Control Circuit (FIG. 3)

The mode control circuit 300 (FIG. 3) comprises a load required flip flop 310, a load flip flop 320, a run flip flop 330, and some input gates for these flip flops. FIG. 3 also shows some line drivers by the symbol D in a triangle.

Input signals received on line DS (with the designation after a driver following in parentheses) are a load command LDCMD+ (LOADENB+), a run command RUNCMD+ (RUNENB+), a standby command STBYCOM(STBYENB−), ERROR(-MODECLR−), the single when power is turned on PWRST(INIT−), a load clock command DSLDCLK+ (LDCLK+), a transfer load strobe command TRANCMD− (LDSTB−), and a transfer required command for load busy enable TRANREQ− (LDBUSYENB−). Other inputs are a load not complete signal on lead LDNOTCMP− from FIG. 4, and a load overflow signal on lead LDOF− from FIG. 6.

Figure 4:
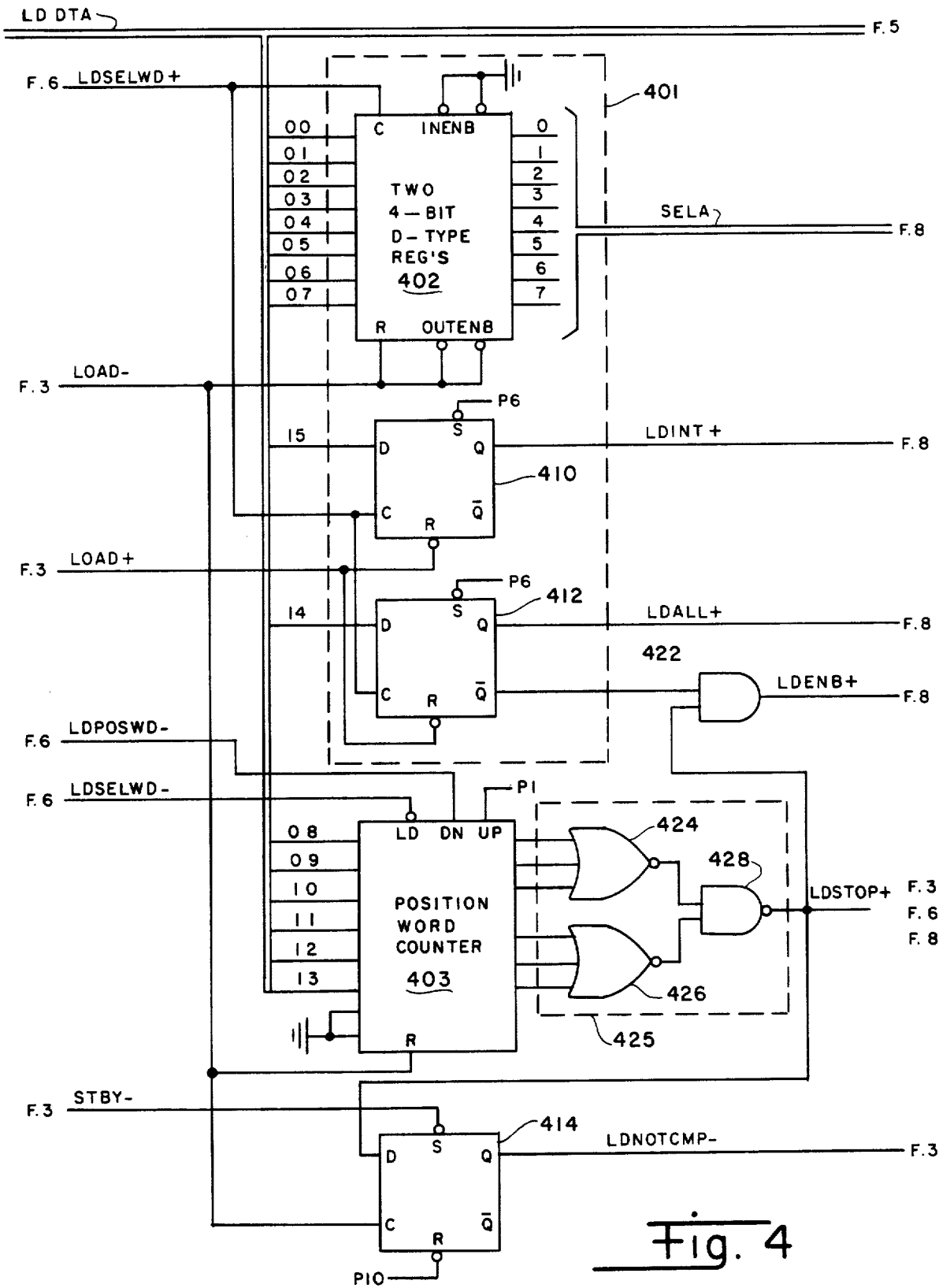
Figure 6:
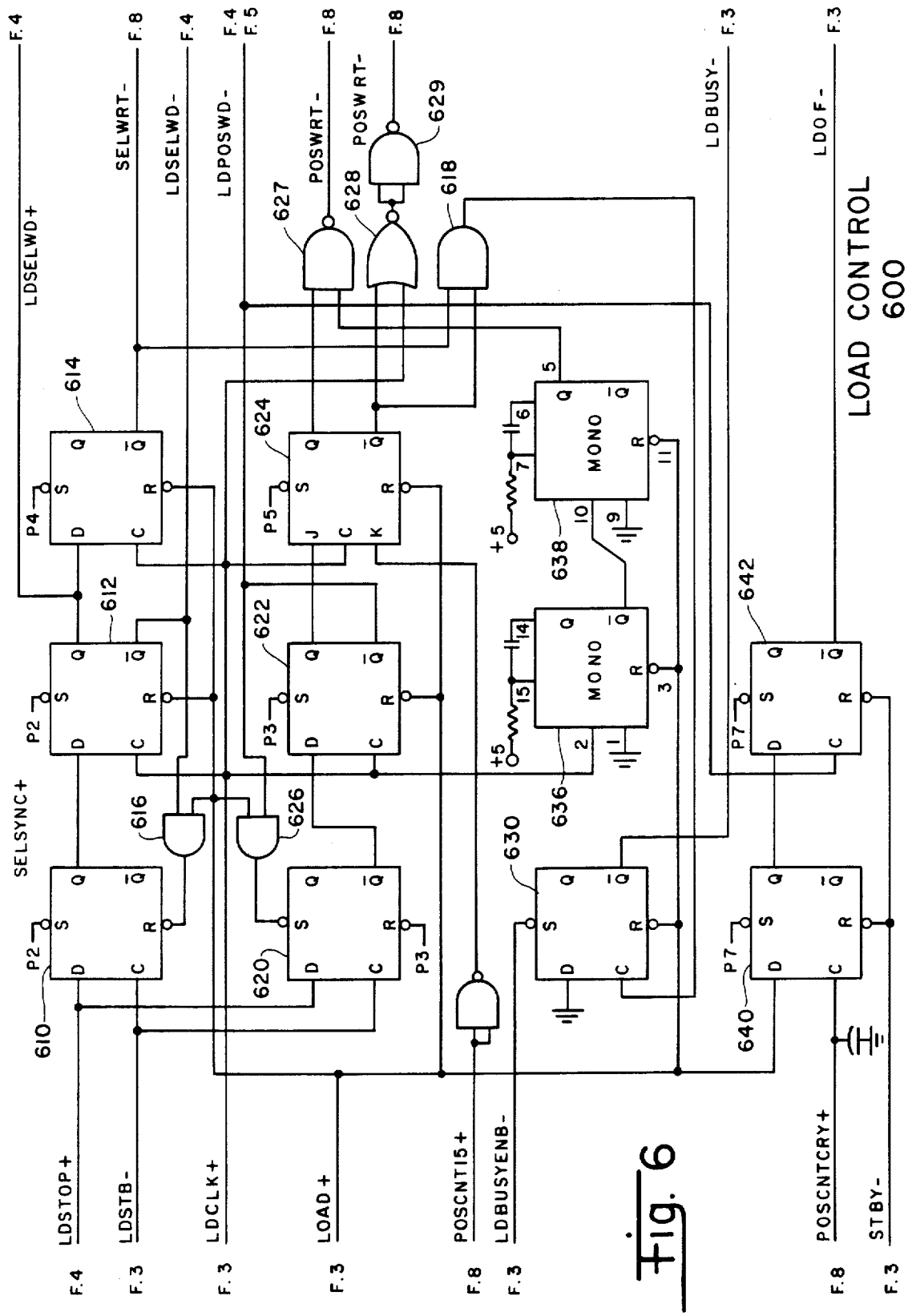
Figure 7:
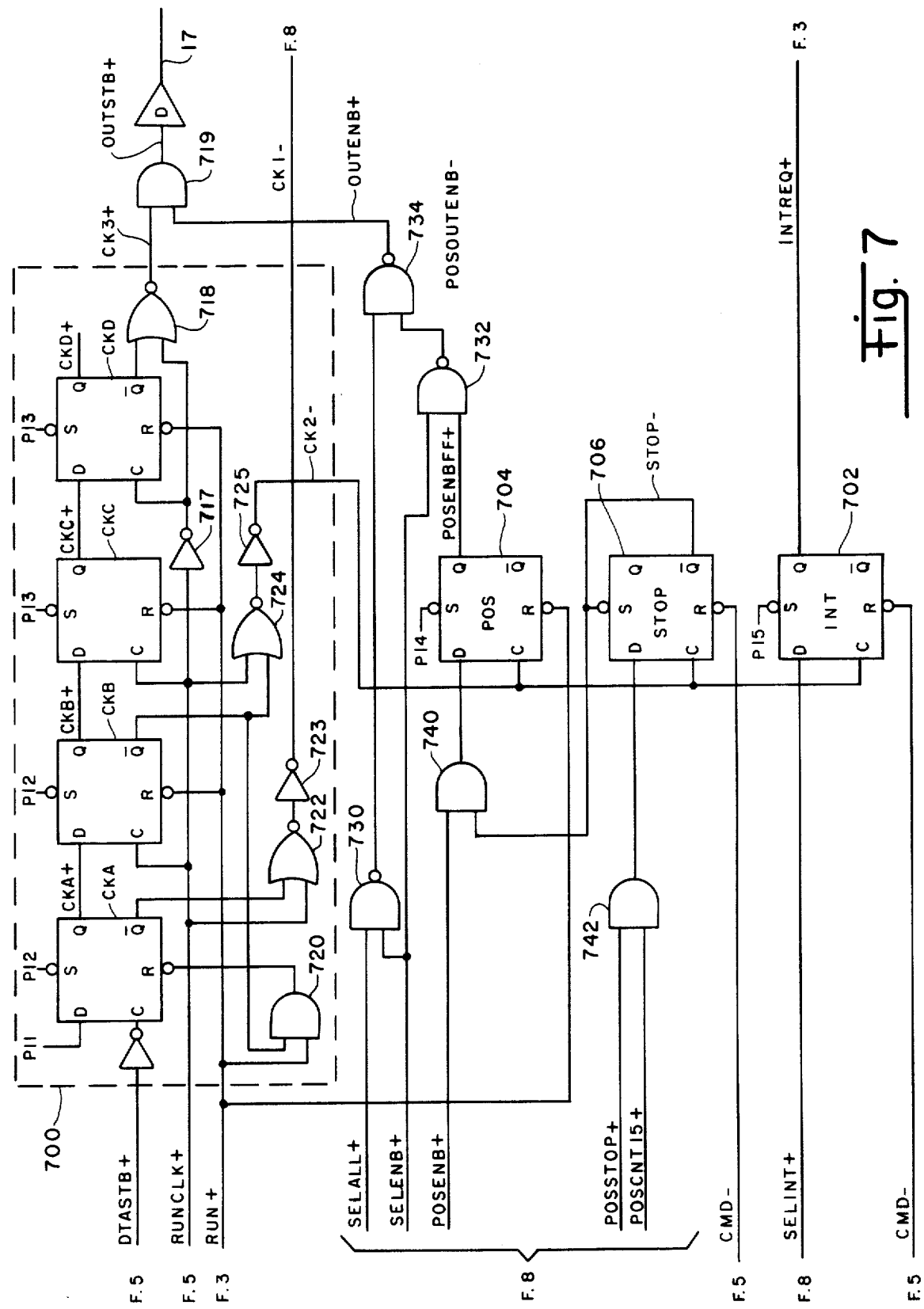
Figure 8:
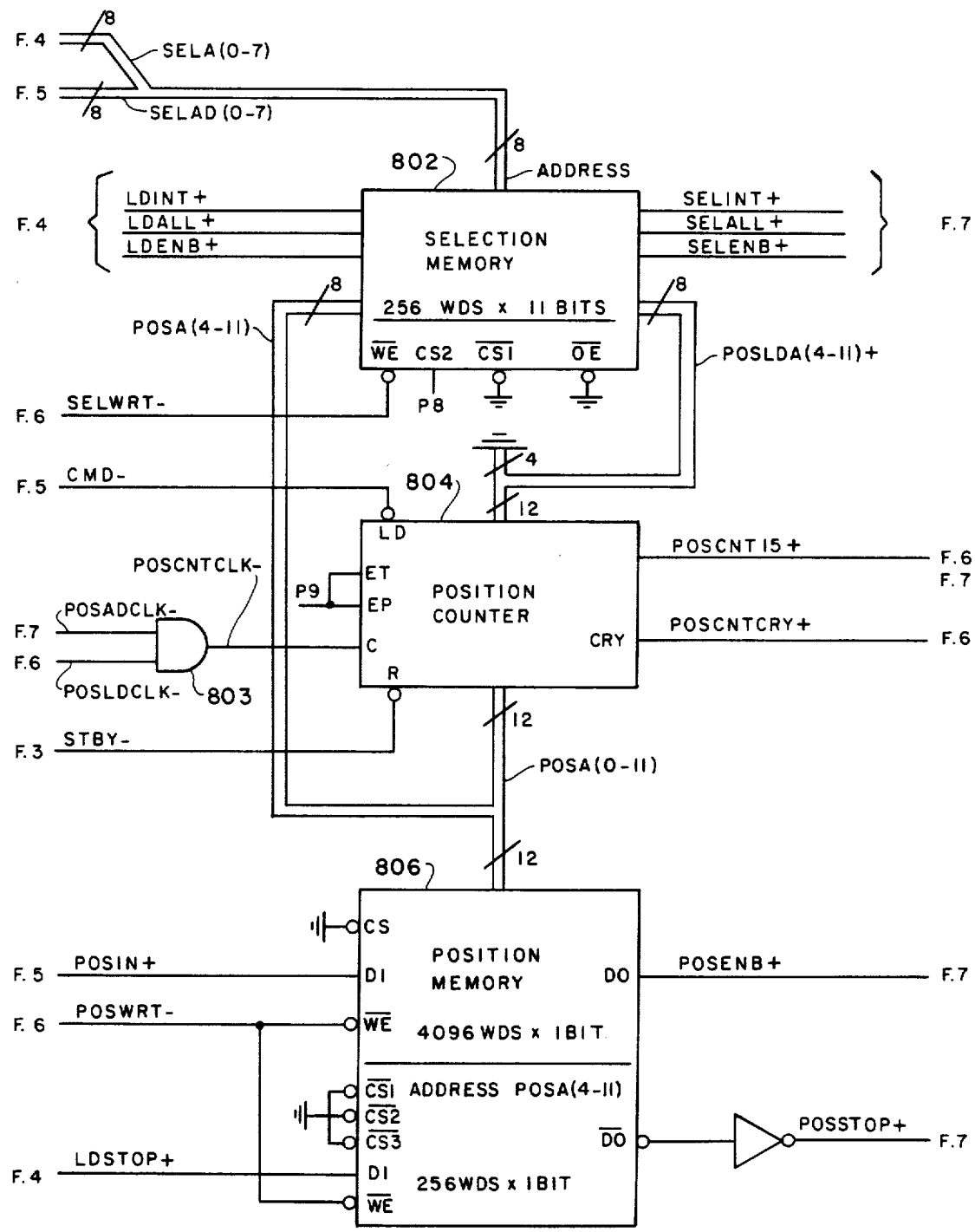

Initially, when the switch 902 in FIG. 9 is turned on, the signal on lead PWRST− (INIT−) via gate 312 sets the load required flip flop 310, via gates 316 and 322 resets the load flip flop 320, via gate 316 resets the run flip flop 330, and via gate 318 generates a signal STBYGEN−, which is repeated via a driver to lead STBY− to FIGS. 4, 6, & 8, and also via a driver to lead DSSTBY− of line DS. During operation the signal STBYCMD− (STBYENB−) in like manner via gates 316, 318, 322 & 324 resets the flip flops 320 and 330 and generates the signal STBYGEN−. Lead STBYENB− is connected to gate 314 to disable LOADSET during STBY− and to gate 324 to disable RUNSET. Note: Either LOADCMD or RUNCMD may be high during STBYCMD low—gates 314 & 324 are disabled under this condition. The signal ERROR− (MODECLR−) like the signal PWRST− sets flip flop 310, resets flip flops 320 & 330, and generates the signal STBYGEN−.

The signal LDCMD+ via gate 314 sets the load flip flop 320 (signals on leads STBYENB−, MODECLR−, and RUNFF− at the other inputs of gate 314, are in there inactive high state). The output from flip flop 320 on lead LOADFF+ in going positeve clocks flip flop 310 to reset it.

8.0 STATUS INDICATIONS

The data unit indicates eight possible conditions to the computer or the operator. Conditions 2 and 3 are signals to the bus interface card 11, and the other six are signals on conductors in line DS. These are as follows:

| | Line DS | |
|---|---|---|
| 0. | DSSTBY− | Standby - Unit is ready for load or run mode of operation. |
| 1 | DSRUN+ | Run - Unit is in run mode. |
| 2 | DTAOF | Data Overflow - Run mode fault indicating selected data memory has overflowed due to computer not accepting data at acceptable rate. Unit must be put in standby mode to remove this condition. |
| 3 | NOCLK | No Data Clock - Run mode fault indicating no input data available due to loss or lack of input clock. Unit must be put in standby mode to remove this condition. |
| 4 | DSLOAD+ | Load - Unit is in load mode. |
| 5 | DSLDREQD− | Load Required - Condition indicating unit requires selection load before it can be placed in the run mode. This condition occurs at power on, computer initialization, or after the clearing of a load mode fault. Unit must be put in load mode to remove this condition. |
| 6 | DSLDNCMP− | Load Not Complete - Load mode fault indicating the correct number of position words had not been transferred when the unit was removed from the load mode. Unit must be put in standby mode to remove this condition and obtain a load required indication. |
| 7 | DSLODF− | Load Overflow - Load mode fault indicating more than 256 position words were transferred to the data select unit. The unit must be put in the standby mode to remove this condition and obtain a load required indication. |

8.1 Computer Status Indications

The above status signals are shown in FIG. 3 on leads from driver outputs to line DS. The status indications are presented to the computer 50 (FIG. 1A) via the VAX interface card 21 using the status bits of the command/status register. The function of these bits are as follows:

| BIT | NAME | FUNCTION |
|---|---|---|
| 09 | DSTATC | HIGH = BINARY WEIGHT OF 1 |
| 10 | SSTATB | HIGH = BINARY WEIGHT OF 2 |
| 11 | DSTATA | HIGH = BINARY WEIGHT OF 4 |

8.2 Manual Status Indications

The status indications for each bus are continuously indicated to the operator by separate digital readouts displaying the eight possible conditions. In addition a right hand decimal point is illuminated for manual operation and a left hand decimal point is illuminated for simulated data.

9.0 FAULT INTERRUPTS

The computer will normally be setup so that an interrupt will be received if a data select fault occurs. (See Section 8.0 for fault conditions.) This is accomplished by the computer setting bit 06, the interrupt enable bit of the command/status register. This enables the data select unit via lead OUTINTREQ+ of line DS to set bit 13, the ATN bit of the command/status register; which sets bit 15, the ERR bit which causes a halt to the present operation and an interrupt to occur. Bits 13 and 15 will remain set until the data select unit is placed in the standby mode removing the fault.

Referring to section 7.0, it should be noted that only bit 15 will be set if the unit is in manual control. This allows the computer to tell if a fault occurred or if the unit was placed in manual control.

10.0 SELECTION FORMAT

Selection of the desired data is determined by loading two types of words into the data select unit. These may be loaded by the computer or manually, but must be in the following formats.

10.1 Command Select Word

When in the load mode, the data select unit is always expecting a command select word unless the last command select word received, defined a number of position select words to be received. The format of the command select word is as follows:

| INT | ALL− | NO. POS. WDS. | | | | | SELECT FORMAT | | | | | |
|---|---|---|---|---|---|---|---|---|---|---|---|---|
| -15- | 14- | 13- | 12- | 11- | 10- | 09- | 08- | 07- | 06- | 05- | 04- | 03- | 02- | 01- | 00- |
| MSB | | | | | | | | | | | | | | | LSB |

SELECT FORMAT is the eight possible bits found in the bus command word that defines the transfer.

NO. POS. WDS. is six bits which define how many (0 to 63) position selection words will be transfered following this command select word.

ALL is a bit that will select all words associated with the selected bus command word to be processed as selected data. INT is a bit that will cause the data select unit to signal the computer by using an interrupt prior to the transfer of the selected bus command word for use as synchronization or timing by the computer.

It should be noted that to clear a selection the above word would have both the ALL and NO. POS. WDS. set to zero. Normally all bus command selects would first be cleared prior to transferring the desired selections.

10.2 Position Select Word

The data select unit is only expecting position select words when defined by the last received command select word. This is limited to 63 words for any bus command word. The format of the position select word is as follows:

| POS WD 1 | | | | | | | | | | | | | | | |
|---|---|---|---|---|---|---|---|---|---|---|---|---|---|---|---|
| -WD - | | | | | | | | | | | | | | | -WD- |
| 15- | 14- | 13- | 12- | 11- | 10- | 09- | 08- | 07- | 06- | 05- | 04- | 03- | 02- | 01- | 00- |
| MSB | | | | | | | | | | | | | | | LSB |

-continued

```
                POS WD 2
-WD  .  .  .  .  .  .  .  .  .  .  .  .  .  .  .  . -WD-
  -  32- 31- 30- 29- 28- 27- 26- 25- 24- 23- 22- 21- 20- 19- 18- 17-
MSB                                                              LSB
                         ETC
```

To select a particular word within a transfer the associated bit defining its positioon is set. WD 1 is the buss command word, with each following word being the next indicated position. It does not matter how many words are in the actual transfer. The last position word required is the last one with a selection. There may be more or less actual words than indicated by the position words.

As only 63 position words can be associated with a command word, a selection can only be from the first 1008 words of a transfer. Another data select limitation is that no more than 256 position words can be loaded for any total selection.

11.0 SELECTION LOADING

The selection loading may be performed by the computer or manually. (See section 10.0 for the correct loading formats).

11.1 Computer Loading

For the computer to load the data select, it would first setup for one or more DMA transfers containing the desired selections. It would then place the data select unit in the load mode with the 00 bit, the GO bit of the command/status regiister set. This causes bit 07, the READY bit of the command/status register to go low. This causes the signal on lead LDCMD+ of line DS to go high, indicating to the data select unit that data is ready to be transferred. The data select unit will then request a transfer which it will input when the computer indicates the data is available. After loading this word in its memory the data select unit will request the next word. This process will continue until the DMA is complete at which time the READY bit goes high, or until the data select unit is removed from the load mode.

11.2 Manual Loading

For the data select unit to be loaded manually the unit would be placed in the manual load mode (see section 7.2), this enables the manual keyboard 930 and associated controls. Actuating the CLR MEM key 932 will automatically transfer the required command select words to clear the selection memories. The desired selections can now be entered by using the hex keyboard 930. Four selections on this keyboard configure the 16-bit load words. As each key is actuated, it is displayed on a four digit digital hex readout 934. After actuation of the fourth key the 16-bit word also appears on a display 936 on a per bit basis as an aid to the operator. In addition a display 938 indicates which load word the data select is expecting. If at any time the operator actuates the wrong key, this can be corrected by pressing the CLR key 940. When the operator has the correct word displayed he presses the LD MEM key 942 which automatically loads the word in the data select memories which is indicated to the operator by blanking the displays and re-enabling the keyboard. This process continues until the unit is removed from the load mode.

11.3 Load Control Circuit

Figure 10:
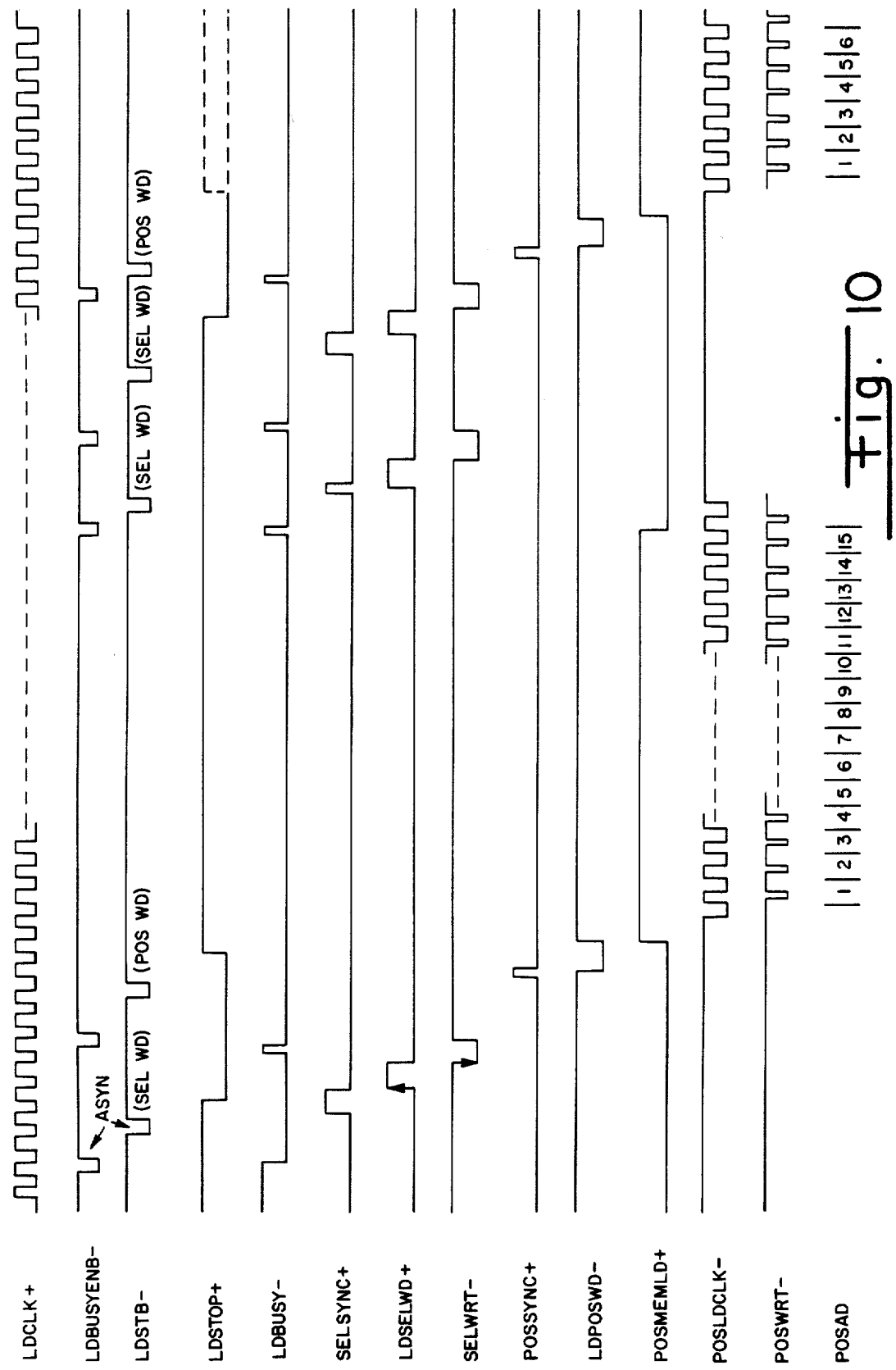
FIGS. 10 and 11 & 11A are timing diagrams for data select loading and data select run.

The load control circuit is shown in FIG. 6, with the timing diagram in FIG. 10. The circuit comprises selection control flip flops 610, 612 & 614, position control flip flops 620, 622 & 624 with monostable devices 636 & 638, a load busy flip flop 630, load overflow flip flops 640 & 642, and some gates. Signals on leads LDCLK+, LDSTB−, and LDBSYENB are supplied via line drivers in FIG. 3 from leads DSLDCLK+, TRANCMD−, & TRANREQ of line DS. Other signals from the mode control circuits of FIG. 3 are supplied via leads LOAD+ & STBY−. During standby the low signal on lead STBY resets flip flops 640 & 642. The signal of lead LOAD+ is also low to reset flip flops 610, 612, 614, 622, 624, & 630, to set flip flop 620, and to reset the monostable devices 626 & 628. In FIG. 8, the signal on lead STBY− resets the position counter 804.

The load command sets the flip flop 320 in FIG. 3 to make the signals on leads LOADFF+ & LOADFF− high and low respectively. The signal on lead LDCLK+ provides the basic load control timing as shown at the top of FIG. 10. The time of one cycle from leading edge to leading edge is approximately one nanosecond. The signals on leads LDBUSYENB− and LDSTB− are received asynchrounsly. The first signal received as shown in FIG. 10 is a negative pulse on lead LDBUSYENB−, which sets flip flop 630, to place a low signal on lead LDBUSY− via a driver in FIG. 3 to lead DSLDBUSY− of line DS. Next a negative pulse is received on lead LDSTB− to initiate loading a select word. The signal on lead LDSTOP+ is high at this time, so flip flop 610 is set when it is clocked by the trailing edge of the pulse on lead LDSTB−, causing the signal on lead SELSYNC+ to go high. The leading edge of the next clock pulse sets flip flop 612 to make the signal on lead LDSELWD+ high. The next clock pulse sets flip flop 614 to make the signal on lead SELWRT− low. When flip flop 612 is set, the signal at its Q− output via gate 616 resets flip flop 610 to make the signal on lead SELSYNC+ go low again, so that the next clock pulse resets flip flop 612 to cause the signal on lead LDSELWD+ to return to low. Then the next clock pulse resets flip flop 614 to return the signal on lead SELWRT− to high. When the flip flop 614 sets, the low signal on lead SELWRT− also via gate 618 and lead LDBSYRST− triggers the flip flop 630 to the reset state, to place a high signal on lead LDBUSY−, which is followed by a low signal on lead LSBUSYENB− to again set flip flop 630 and end the positive pulse on lead LDBUSYENB−.

The signal on lead LDSELWD+ goes to the clock inputs of the command select store 401 and flip flops 410 & 412, and the signal on lead LDSELWD− goes to the load input of the position word counter 403 in FIG. 4. The pulses on these leads cause data on line LD DTA to be loaded, with eight bits 00–07 into the command store 401, six bits 08–13 into the position word counter 403, and two bits 15 & 14 into flip flops 410 and 412.

The signal on lead SELWRT− goes to the write enable input of the selection memory 802 in FIG. 8. The address is supplied from the command select store 401 on the eight leads of line SELA. The data is supplied from position counter 804 as POSA (4-11) and also from flip flops 410 and 412. Also a signal on lead LDENB+ depends on the state of flip flop 412 and the signal on lead LDSTOP via gate 422. The timing diagram shows that the signal on lead LDSTOP+ is low at this time, and therefore the signal on lead LDENB+ will be high. The pulse on lead SELWRT− causes the data to be loaded into the selection memory 802.

The timing diagram shows a second negative pulse received on lead LDSTB− for loading a position word. For a select word LDSTOP+ is high causing flip flop 610 to set resulting in SELWRT−. If a count was loaded into position word counter 403 from the select word, LDSTOP is now low. Therefore the next word will cause flip flop 620 to reset resulting in POSWRT−, or the loading of a position word.

Next a negative pulse is received on lead LDSTB− to initiate loading a position word. The signal on lead LDSTOP+ is low at this time, so flip flop 620 is reset when it is clocked by the trailing edge of the pulse on lead LDSTB−, causing the signal on lead POS-SYNC+ to go high. The leading edge of the next clock pulse sets flip flop 622 to make the signal on lead LDPOSWD− low, causing the position word to be loaded into shift register 501. When flip flop 622 is set, the signal at its Q− output via gate 626 resets flip flop 620 to make the signal on lead POSSYNC+ go low again, so that the next clock pulse resets flip flop 622 to cause the signal on lead LDPOSWD− to return to high. The next clock pulse also sets the JK flip flop 624 to make the signal on lead POSMEMLD± high and low respectively.

Mono's 640 and 642 generate approximately a 100 ns pulse delayed approximately 100 ns from the rising edge of each clock. As long as flip Flop 624 is set these pulses are gated through gate 627 to write into position memory 806. In addition, gates 628 and 629 generate POSLDCLK− which goes to the clock input of the position word shift register 501 in FIG. 5, and also via gate 803 in FIG. 8 to the clock input of the position counter 804. The bit on lead POSIN+ is read out serially from the position word shift register 501 as it is clocked by the signal on lead POSLDCLK−. Flip flop 624 will stay set for 16 clocks writing each bit of the position word into memory 806. If this is the last position word required, counter 403 will be zero and LDSTOP+ will be high causing this bit to be written into the stop portion of memory 806. Either way flip flop 624 resets after the 16 clocks and the circuitry is ready to receive the next word.

12.0 SELECTION OUTPUT

The selected data may be output to the computer and displayed to the operator, or may just be displayed to the operator.

12.1 Selected Data to Computer

For the computer to receive the selected data, it would setup a DMA of the desired length, which it expects to be terminated by receiving the specified number of words or by a pre-selected interrupt. (See section 10.1). It would then place the data select unit in the run mode with the 00 bit, the GO bit of the command/status register set. This causes bit 07, the READY bit of the command/status to go low indicating to the data select unit that the computer is ready to receive data. This causes the signal on lead RUNCMD+ of line DS to go high, indicating to the data select unit that data is ready to be selected. When the data select has data ready to transfer it will place this data on the computer lines and request it be transferred. When the computer indicates it has obtained the data, the data select will then repeat the above request for each data word it has ready to transfer. This process will continue until the DMA is full or the data select causes an interrupt to occur, either will cause the READY bit to go high indicating the computer is not ready to receive data. The computer must setup a new DMA and repeat the above process to receive more data, or remove the data select from the run mode.

The data on the computer lines are displayed to the operator by a four digit digital hex readout. In addition, a right hand decimal point is illuminated for a command word, and a left hand demical point is illuminated for a pre-selected interrupt.

12.2 Selected Data Without Computer

Display of the selected data without use of the computer is accomplished by manually placing the data select unit in the run mode. (See section 7.2) In this condition, the data select simulates the computer making the operation appear normal to the operator.

12.3 Run Control in the Data Select Unit

Figure 5:
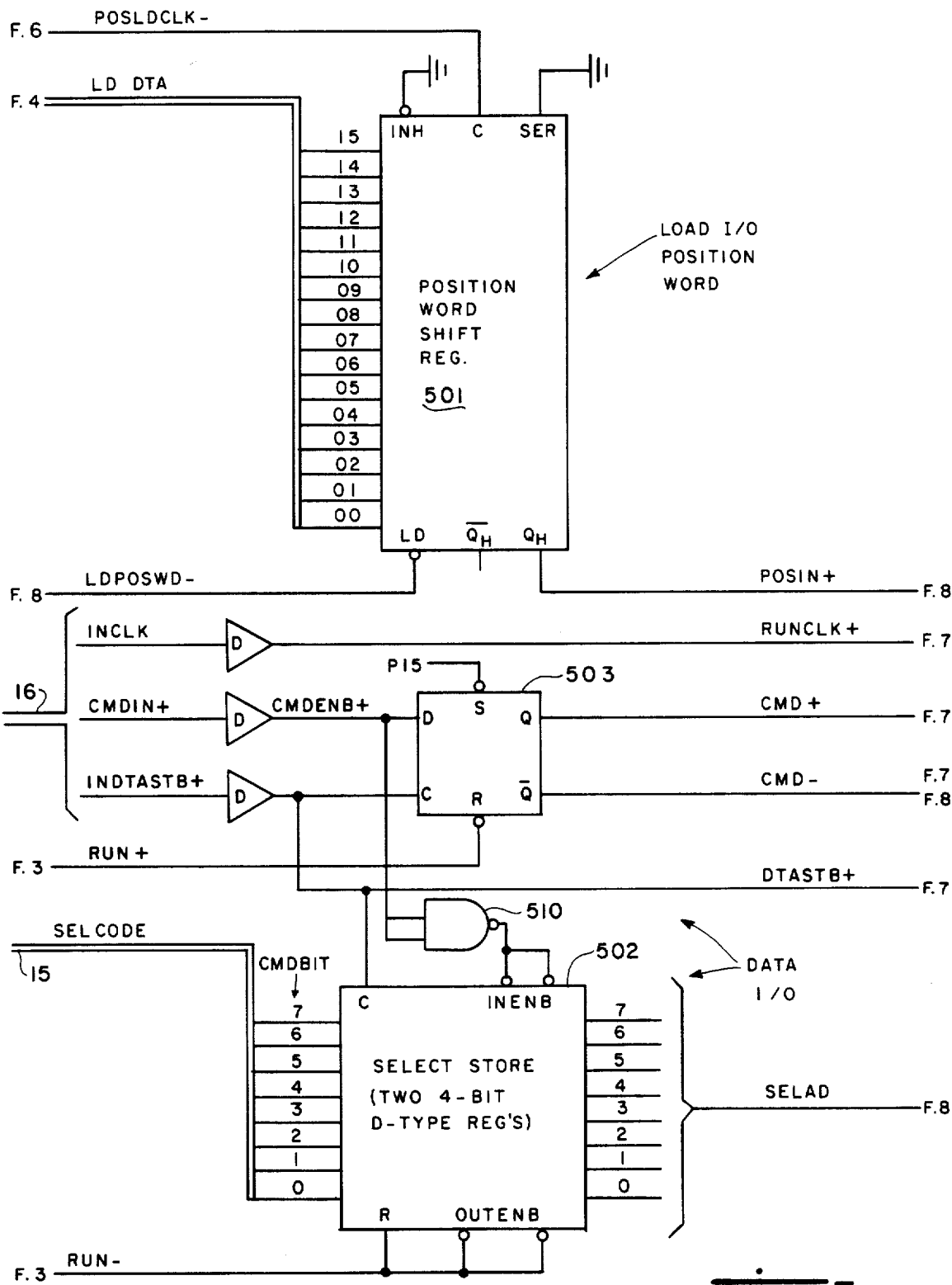
Figure 11:
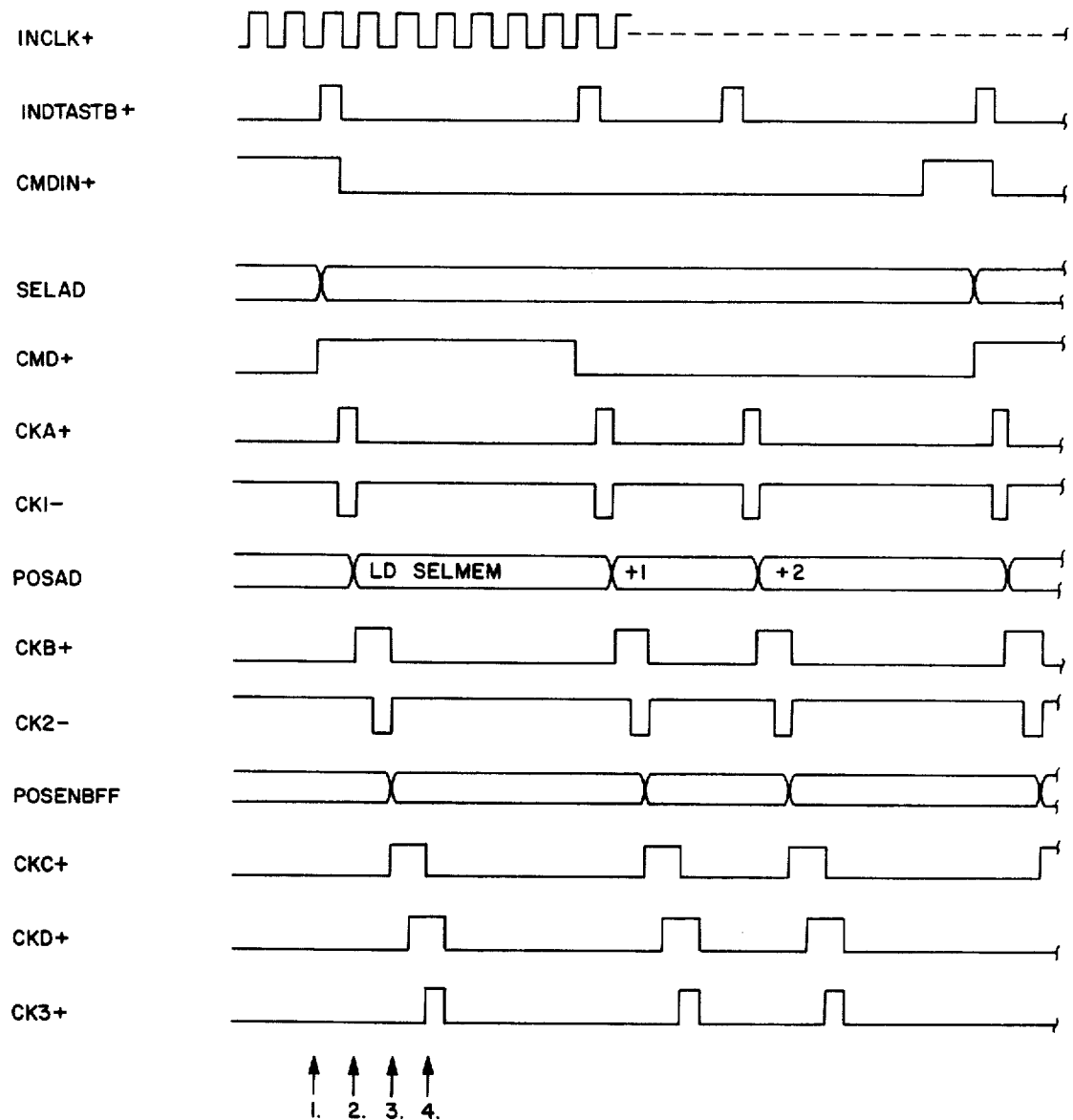
Figure 11A:
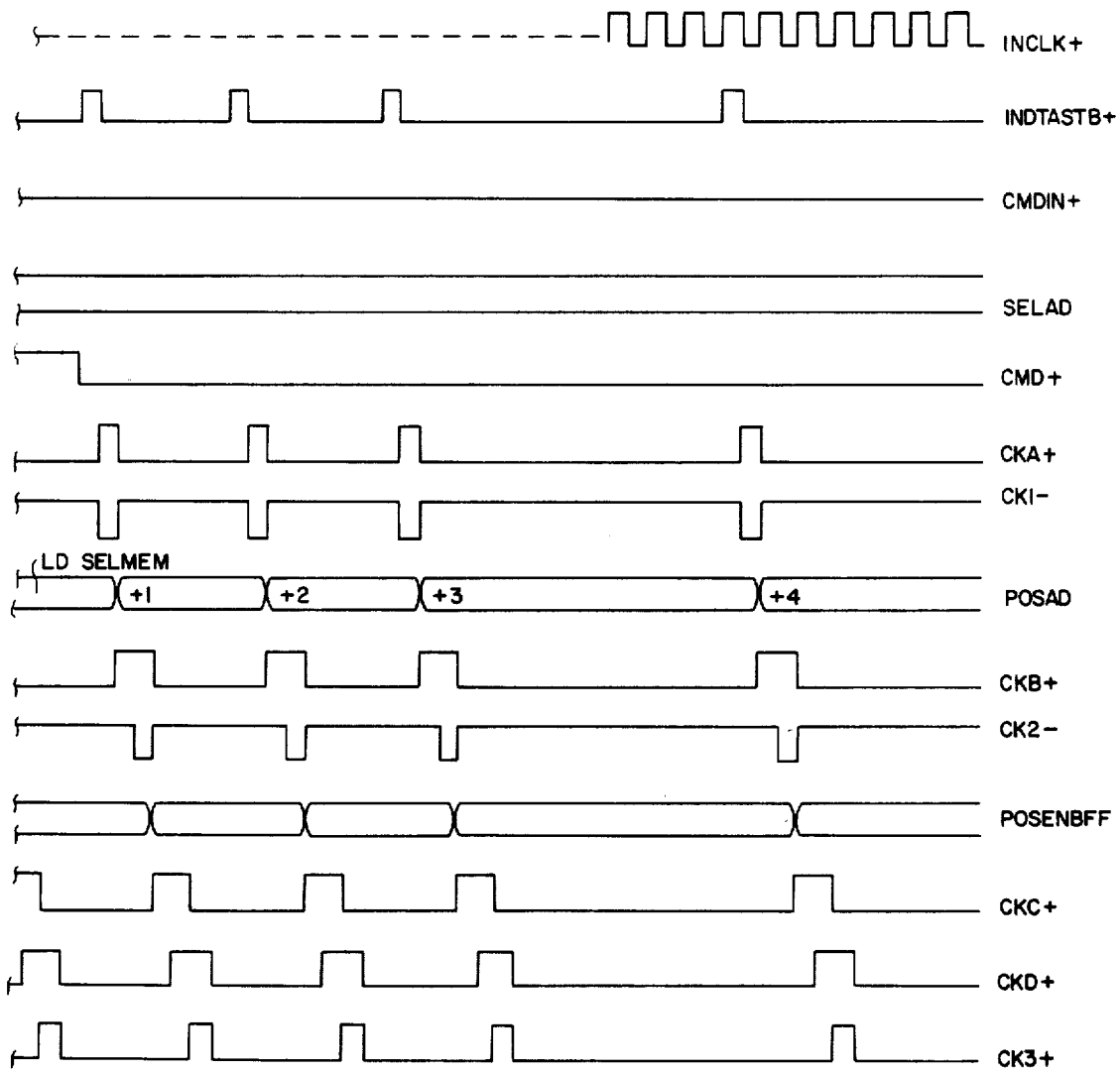

The command received on lead RUNCMD+, via a driver, lead RUNENB+, and gate 324, sets the run flip flop 330. Its output signal on lead RUNFF+ clocks the load flip flop 320 to the reset state. The output is supplied via a driver to lead DSRUN+ of line DS, and also via other drivers and leads RUN+ & RUN− to FIGS. 5 and 7. The reset inputs of the select store 502, the command flip flop 503, and the clock 700 now become inactive. The output enable of the select store 502 is now active. The timing diagram in FIG. 11 shows the signals on leads INCLK+, INDTASTB+ AND CMDIN+ received on line 16 from the bus interface card 11 (FIGS. 1 & 5).

The clock 700 comprises flip flops CKA, CKB, CKC, & CKD. The Q+ output of each of the first three of these flip flops is connected to the D input of the following flip flop. The clock input of flip flop CKA is received from lead INDTASTB+ via a driver in FIG. 5 and lead DTASTB+. The signal on lead INCLK+, via a driver in FIG. 5 and lead RUNCLK+ is supplied to the clock inputs of flip flops CKB and CKC, and via an inverter 717 to the clock input of flip flop CKD. The output of inverter 717 is also an input of a NOR gate 718. The operation of the flip flops of the clock 700 is shown in the timing diagram by the lines CKA+, CKB+, CKC+ AND CKD+. The timing diagram also shows the clock output signals CK1−, CK2− and CK3+. The signal on lead CK1− is from gates 722 & 723 which provide an OR function with inputs CKB− and RUNCLK+. The signal on lead CK3+ is from NOR gate 718 with inputs CKD− and RUNCLK−.

The four vertical arrows in the lower left corner of the timing diagram (FIG. 11) indicate the following:
1. In data edge+selection address.
2. Select memory out+position address
3. Position memory out
4. Out data edge The input signals on leads CMDIN+ and INDTASTB+ via drivers are supplied to the D and C inputs respectively of the command flip flop 503, with the resulting state shown as CMD+ in the timing diagram. These input signals are also supplied to the select store 502 for input enable and clocking. The select bits of the command word received on line 15 from the bus interface are connected as data inputs of the select store 502. The coincidence of the signals CMDIN+ and IND- TASTB+ causes the data from line 15 to be loaded into the select store 502. The output of the select store 502 is supplied as an address to the selection memory to read data from leads SELNT+, SELALL+, SELENB+, and eight bits on line POSLDA. Output from the selection memory 802 on leads SELINT+, SELALL+ and SELENB+, along with signals on leads POSENB+ & POSSTOP+ from the position memory, and the signal on lead POSCNT15+ from the position counter 804, are supplied to FIG. 7 to control loading of the the position flip flop 704, the stop flip flop 706, and the interrupt flip flop 702, and the operation of the various gates to provide the signal on lead OUTENB+. These flip flops are clocked by a signal on lead POSRDCLK−, supplied via gates 724 and 725 from lead POSRDENB− when strobed with a pulse on lead RUNCLK+. The signal on lead OUTENB+ determines which words are selected by controlling the output of pulses from the clock generator 700 on lead OUTCLK+ via gate 719. The pulses on lead OUTSTB+ via a driver are supplied to the bus interface circuit 11 to control the in clocking of data to the FIFO memory.

13.0 DATA INTERUPTS

Data interrupts are pre-selected (See section 10.1) during the load sequence. These are used by the computer for synchronization and timing. When the data select unit obtains a command word for which an interrupt has been pre-selected, it interrupts the computer prior to making the word ready to transfer to the computer. This is accomplished by the data select unit via lead OUTINTREQ+ of line DS pulsing bit 13, the ATN bit of the command/status register; which causes a halt to the present operation and an interrupt to occur.

The halt is indicated to the data select by the READY bit going high. The interrupt enable, bit 06 of the command/status register must have been set by the computer for the interrupt to occur. This interrupt is defined as a data interrupt by both the ATN and the ERR bits being low.

14.0 DIGIBUS DATA

This data is received in the form of data blocks. Each block is composed of a command word followed by a variable number of data words. A block containing only a single data word is received as 26 serial bits; the first eight bits are the command word, the ninth bit is not used, bits 10 through 25 (16 bits) ae the data word, and bit 26 is odd parity of the data word. This transfer is converted to two 16-bit words, the first containing the eight-bit command word, and second the 16-bit data word. If the block contains more than one data word, each additional data word requires 19 more serial bits; the first two bits are not used, the next 16 bits are the data word, and the last bit is the parity of the data word. Each additional data word is converted to an additional 16-bit data word. The command word contains the information necessary to define the message being transferred, which defines the data words which follow by the position within the message.

The words as they are transferred to the Test Bench computer appear as follows:

| COMMAND WORD |||||||||||||||
|---|---|---|---|---|---|---|---|---|---|---|---|---|---|---|
| -- | ZEROS ||| -- | --I/O-- || STAT# ||| -- | WD# || -- |
| -15- | 13- | 13- | 12- | 11- | 10- | 09- | 08- | 07- | 06- | 05- | 04- | 03- | 02- | 01- | 00- |

ZEROS - Logical Zeros
I/O - Radar Computer Input/Output
  1 = Input
  2 = Output
STAT# - Station Number (0 to 15)
  DIGIBUS Station Receiving or Sending Data
WD# - Word Number (0 to 15)
  Defines Data Words being transferres to or from Station Defined by STAT#

| DATA WORD ||||||||||||||||
|---|---|---|---|---|---|---|---|---|---|---|---|---|---|---|---|
| -- (MSB) | | | | | | DATA ||||||| | (LSB) | |
| -15- | 14- | 13- | 12- | 11- | 10- | 09- | 08- | 07- | 06- | 05- | 04- | 03- | 02- | 01- | 00- |
| DATA - Data Word as Defined by Command Word and position. |||||||||||||||| |

To make a selection from this bus the Command Select Word is formatted as follows. (See Section 10.1)

| COMMAND SELECT WORD |||||||||||||||
|---|---|---|---|---|---|---|---|---|---|---|---|---|---|---|
| | | | | | | -- | SELECT FORMAT |||||||| 
| -INT-ALL-- | NO. POS. WDS ||| -I/O- | STAT# ||| -- | WD# || |
| -15- | 14- | 13- | 12- | 11- | 10- | 09- | 08- | 07- | 06- | 05- | 04- | 03- | 02- | 01- | 00- |

SELECT FORMAT - Contains the 8-bit command word whose message contains desired data.
NO. POS WDS - Would be zero if all the words from this message are desired, or some number (1 to 63) if only particular words are desired.
ALL - Would be one if all the words from this message are desired, and zero if only particular words are desired.
INT - Would be one if an interrupt is desired prior to the transfer of the selected command word to the test bench computer.

If the NO. POS. WDS. was set to some number, this number of Position Select Words must be sent following the Command Select Word. (See Section 10.2) If the command word is to be selected the LSB of the first Position Select Word would be set, if first the Data Word is to be selected the second LSB of the Position Select Word would be set. The next LSB would be set if the next word is to be selected and so forth. Each Position Select Word is used to select from groups of sixteen words in sequential order. The last Position Select Word required is one with a selection, even though the message may contain more words.

A data block can be transferred on digibus every 13.5 microseconds, but the maximum expected rate is 64 data blocks (128 words) in a radar period of 4 milliseconds. This unit is configured so that it can temporarily store 64 selected data blocks (128 words), or the data from a radar period. This allows for Test Bench Computer delays in obtaining the selected data.

14.1 Digibus Simulator

The built in Digibus Simulator outputs all possible command word combinations with two associated data words. It outputs a data block every 49 microseconds or approximately 82 data blocks in (246 words) a 4 millisecond period. All possible 256 combinations are output approximately 12.5 milliseconds. The command words are output in sequential order from 0 to 255. The data words associated with a command word has the following format:

| CMD WD TRUE | | | |
|---|---|---|---|
| -15- 14- 13- | 12-11-10-09-08-07-06-05-04-03-02-01-00- | | * |
| *FIRST DATA WORD | = CMD WORD INVERTED | | |
| SECOND DATA WORD | = CMD WORD TRUE | | |

This allows all possible combinations to be selected for verification and test purposes.

15.0 PSPBUS DATA

PSPBUS data is received in the form of data blocks. Each block is composed of a command word followed by a variable number of data words. All words contain 16 bits. The command word defines the message being transferred, which defines the following data words by their position within the message. The words as they are transfered to the Test Bench Computer appear as follows:

| COMMAND WORD | | | |
|---|---|---|---|
| -I/O- TST - | INST | -- | ITD -- |
| - 15- 13- | 13- 12- 11- 10- 09- 08- 07- 06- 05- | 04- 03- 02- 01- 00-- | |

| | | |
|---|---|---|
| I/O | - | Radar Computer Input/Output<br>1 = Input<br>0 = Output |
| TST | - | Test bits used for PSP Test |
| INST | - | Instrumentation bits used with I/O to define message type |
| ITD | - | Input transfer directive used by PSP for input data selection. |

| DATA WORD | | |
|---|---|---|
| -- (MSB) | DATA | (LSB) |
| - 15- 14- 13- 12- 11- 10- 09- | 08- 07- 06- 05- 04- 03- 02- 01- | 00- |
| DATA - Data Word as Defined by Command Word and position. | | |

To make a selection from this bus the Command Select Word is formatted as follows. (See Section 10.1)

| COMMAND SELECT WORD | | | | |
|---|---|---|---|---|
| | | -- | SELECT FORMAT | |
| -INT-ALL-- NO. POS. WDS | | --I/O-- INST | | - 0 |
| - 15- 14- 13- 12- | 11- 10- 09- | 08- 07- 06- 05- 04- | 03- 02- 01- | 00- |

| | | |
|---|---|---|
| SELECT FORMAT | - | Contains the I/O bit and the six INST bits from the command word whose message contains the desired data, plus a zero LSB bit. |
| NO. POS WDS | - | Would be zero if all the words from this message are desired, or some number (1 to 63) if only particular words are desired. |
| ALL | - | Would be one if all the words from this message are desired, and zero if only particular words are desired. |
| INT | - | Would be one if an interrupt is desired prior to the transfer of the selected command word to the test bench computer. |

If the NO. POS. WDS. was set to some number, this number of Position Select Words must be sent following the Command Select Word. (See Section 10.2) If the command word is to be selected the LSB of the first Position Select Word would be set. The next LSB would be set if the next word is to be selected and so forth. Each Position Select Word is used to select from groups of sixteen words in sequential order. The last Position Select Word required is one with a selection, even though the message may contain more words.

A command or data word can be transferred on PSPBUS every 1.29 microseconds, but the maximum expected rate during normal operation is 600 words in a radar period of 4 milliseconds. This unit is configured so that it can temporarily store 1024 selected words, or at least the data from a radar period. This allows for Test Bench Computer delays in obtaining the selected data.

15.1 PSPBUS Simulator

The built in PSPBUS Simulator outputs all possible message types with associated data words. Each message contains 32 words: A command word followed by 31 data words. It outputs a new message every 256 microseconds or aproximately 500 words every 4 milliseconds. All possible 128 message type combinations are output approximately every 33 milliseconds. The message types are output in sequential order from 0 to 127. The message format is described as follows. Each word contains two counts, a command count and a data count. The command count (0 to 127) is incremented for each message type, and the data count (0 to 31) is incremented for each data word in the message.

Each word appears as follows:

| COMMAND CNT | | | | | | | | | DATA CNT | | | | | |
|---|---|---|---|---|---|---|---|---|---|---|---|---|---|---|
| -64- | 64- | 32- | 16- | 8- | 4- | 2- | 1- | 2- | 1- | 16- | 8- | 4- | 4- | 2- | 1- |
| -15- | 14- | 13- | 12- | 11- | 10- | 09- | 07- | 06- | 05- | 04- | 03- | 02- | 02- | 01- | 00- |

This allows the command word to contain a data count or zero and each data word (1 to 31) to contain the command count of the associated message. This provides all possible combinations to be selected for verification and test purposes.

16.0 PSPINST DATA

PSPINST data is received in the form of data blocks. Each block is composed of a command word followed by a variable number of data words. All words contain 16 bits. The header word defines the message being transferred, which defines the following data words by their position within the message. The words as they are transferred to the Test Bench Computer appear as follows:

| HEADER WORD | | | | | | | | | | | | | | |
|---|---|---|---|---|---|---|---|---|---|---|---|---|---|---|
| -PACKET ID | | | | | | | --SUB ID | | | -SPC-LK - X- | | | | |
| -15- | 13- | 13- | 12- | 11- | 10- | 09- | 08- 07- | 06- | 05- | 04- | 03- 02- | 01- | 00- | |

PACKET ID - Used to Define Message Type.

```
           0 --- N   - SPC Packet
           N+1 --- 254 - SPE Packet
           255 - FIT Packet
SUB ID   - Marker & FIT Prog. Number
SPC      - SPC Packet Flag
           "1" - SPC Packet
           "0" SPC or FIT Packet
LK       - Look Sync
X        - Not Used
```

| DATA WORD | | | | | | | | | | | | | | | |
|---|---|---|---|---|---|---|---|---|---|---|---|---|---|---|---|
| -- (MSB) | | | | | | DATA | | | | | | | | (LSB) | |
| -15- | 14- | 13- | 12- | 11- | 10- | 09- | 08- | 07- | 06- | 05- | 04- | 03- | 02- | 01- | 00- |

DATA - Data Word as Defined by Header Word and position.

To make a selection from this bus the Command Select Word is formatted as follows. (See Section 10.1)

| COMMAND SELECT WORD | | | | | | | | | | | | | | | |
|---|---|---|---|---|---|---|---|---|---|---|---|---|---|---|---|
| | | | | | | | -- | SELECT FORMAT | | | | | | | |
| -INT-ALL-- NO. POS. WDS | | | | | -- | | | PACKET ID | | | | | - 0 | | |
| -15- | 14- | 13- | 12- | 11- | 10- | 09- | 08- | 07- | 06- 05- | 04- | 03- | 02- | 01- | 00- | |

SELECT FORMAT - Contains the eight packet ID bits from the header word whose message contains the desired data.

NO. POS WDS - Would be zero if all the words from this message are desired, or some number (1 to 63) if only particular words are desired.

ALL - Would be one if all the words from this message are desired, and zero if only particular words are desired.

INT - Would be one if an interrupt is desired prior to the transfer of the selected header word to the test bench computer.

If the NO. POS. WDS. was set to some number, this number of Position Select Words must be sent following the Command Select Word. (See Section 10.2) If the command word is to be selected the LSB of the first Position Select Word would be set. The next LSB would be set if the next word is to be selected and so forth. Each Position Select Word is used to select from groups of sixteen words in sequential order. The last Position Select Word required is one with a selection, even though the message may contain more words.

A header or data word can be transferred on PSPINST every 1 microsecond, but the maximum expected rate is not normally expected. This unit is configured so that it can temporarily store 1024 selected words. This allows for Test Bench Computer delays in obtaining the selected data.

16.1 PSPINST Simulator

The built in PSPINST Simulator outputs all possible message types with associated data words. Each message contains 32 words: A header word followed by 31 data words. It outputs a new message every 256 microseconds or approximately 500 words every 4 milliseconds. All possible 256 message type combinations are output approximately every 66 milliseconds. The message types are output in sequential order from 0 to 255.

The message format is described as follows. Each word contains two counts, a command count and a data count. The command count (0 to 255) is incremented for each message type, and the data count (0 to 31) is incremented for each data word in the message.

Each word appears as follows:

| COMMAND CNT | | | | | | | | – | DATA CNT | | | | |
|---|---|---|---|---|---|---|---|---|---|---|---|---|---|
| -128- | 64- | 32- | 16- | 8- | 4- | 2- | 1- | 1- | 2- | 1- | 16- | 8- | 4- | 2- | 1- |
| -15- | 14- | 13- | 12- | 11- | 10- | 09- | 08- | 07- | 06- | 05- | 04- | 03- | 02- | 01- | 00- |

This allows the command word to contain a data count of zero, and each data word (1 to 31) to contain the command count of the associated message. This provides all possible combinations to be selected for verification and test purposes.

17.0 MUXBUS DATA

MUXBUS data is received in the form of data blocks. Each block is composed of a command word which is followed by zero to thirty-two data words and zero to two status words. The actual message format depends on the type of transfer taking place. The basic types of transfers are comtroller to terminal, terminal to controller and terminal to terminal.

If the transfer is from controller to terminal, the controller starts the transfer by sending a command word telling the desired terminal to receive certain data words. The data words are transferred by the controller following the command word. At the end of this transfer, the receiving terminal responds by sending a status word. This transfer may consist of zero data words making it only command and status words. It may also be a broadcast command to all terminals, which does not use status word responds making this message a single command word.

If the transfer is from terminal to controller, the controller starts the transfer by sending a command telling the desired terminal to transmit certain data words. The terminal responds by sending a status word followed by the specified data words.

If the transfer is from terminal to terminal, the controller starts the transfer by sending a command word telling the desired terminal to receive certain data words. The controller follows this with a second command word telling the desired terminal to transmit these data words. The transmitting terminal responds by sending a status word followed by the specified data words. At the end of this transfer, the receiving terminal responds by sending a status word.

The various words as they are transferred to the Test Bench Computer appears as follows:

| COMMAND WORD | | | | | | |
|---|---|---|---|---|---|---|
| – | ADDR | – | –T/R– | SUB ADDR | – | WD CNT | – |
| -15- 14- | 13- 12- 11- 10- | 09- 08- 07- | 06- 05- 04- 03- | 02- 01- 00- |

ADDR — Address of the terminal being commanded
T/R — 1 = Transmit Command
0 = Receive Command
SUBADDR — Defines Data being transferred. Bit position 09 is always a one.
WDCNT — Specifies number of data words to be transferred.

| STATUS WORD | | | |
|---|---|---|---|
| – | ADDR | – | STATUS | – |
| -15- 14- | 13- 12- 11- 10- 09- 08- 07- 06- | 05- 04- 03- 02- 01- 00- |

ADDR — Address of the terminal sending the status word.
STATUS — Status bits as defined by the system. Bit position 09 is always a zero.

| DATA WORD | | |
|---|---|---|
| – (MSB) | DATA | (LSB) |
| -15- 14- 13- 12- 11- 10- 09- 08- 07- 06- 05- 04- 03- 02- 01- 00- |

DATA — Data Word as Defined by command word and position within the message.

To make a selection from this bus, the following bits XX from the command word are used.

| – | ADDR | – | –T/R– | SUB ADDR | – | WD CNT | – |
|---|---|---|---|---|---|---|---|
| -15- 14- | 13- 12- 11- 10- 09- | 08- 07- | 06- 05- 04- 03- | 02- 01- 00- |
| XX XX XX | | XX | XX XX XX XX | |
| 3 bits | | 1 bit | 4 bits | |
| (MSB) | | | (LSB) | |

They are formatted into the Command Select Word as follows (see Section 10.1)

| COMMAND SELECT WORD | | | | | |
|---|---|---|---|---|---|
| | | – | SELECT FORMAT | | |
| -INT-ALL– | NO. POS. WDS | –T/R– | ADDR | – | SUB ADDR | – |
| -15- 14- 13- 12- | 11- 10- 09- | 08- 07- | 06- 05- 04- 03- | 02- | 01- 00- |

| | |
|---|---|
| -continued | |
| SELECT FORMAT | - Contains the eight bits from the command word whose message contains the desired data. |
| NO. POS WDS | - Would be zero if all the words from this message are desired, or some number (1 to 3) if only particular words are desired. |
| ALL | - Would be one if all the words from this message are desired, and zero if only particular words are desired. |
| INT | - Would be one if an interrupt is desired prior to the transfer of the selected header word to the test bench computer. |

It should be noted that each command word indicates the start of a new message to the data select unit. Therefore, a terminal to terminal transfer looks like two messges, the first containing the receive command word, and the second containing the transmit command word, the data words and the status words. Any selection from the message would use the transmit command.

If the NO. POS. WDS. was set to some number, this number of Position Select Words must be sent following the Command Select Word. (See Section 10.2) If the command word is to be selected the LSB of the first Position Select Word would be set. The next LSB would be set if the next word is to be selected and so forth. Note, if the selection is from a transmit command the second word is status, and if the selection is from a receive command the second word is data. Each Position Select Word is used to select from groups of sixteen words in sequential order. The last Position Select Word required is one with a selection, even though the message may contain more words.

A word can be transferred on MUXBUS every 20 microseconds, but this maximum is not normally expected. This unit is configured so that it can temporarily store 128 selected words. This allows for Test Bench Computer delays in obtaining the selected data.

17.1 MUXBUS Simulator

The built in MUXBUS Simulator outputs all possible combinations of controller to terminal, and terminal to controller messages. It does not output terminal to terminal messages as these are just a variation of the two simulated message types. Each message contains 34 words: a command word, a status word and 32 data words. If it is a receive message, the status word is last; and if it is a transmit message, the status word follows the command word. A new message is output every 691 microseconds. All possible 256 message combinations are output approximately every 177 milliseconds. The message types are output in sequential order from 0 to 255. The message format is described as follows. Each word contains two counts, a command count and a data count. The command count (0 to 255) is incremented for each message type, and the data count (0 to 31) is incremented for each data word in the message. Each word appears as follows:

command word, it will contain a data count of one, if the status word is last, it will contain a data count of zero. The S- allows bit 09 to be set for all command words and not set for all status words as is required for their deferentiation. This provides all possible combinations to be selected for verification and test purposes.

For complete testing, data is simulated on both the primary and secondary MUXBUS. From the last 64 transmit messages, every other one is sent across the secondary MUXBUS, all others are sent across the primary MUXBUS.

ALTERNATIVE EMBODIMENT

Figure 12:
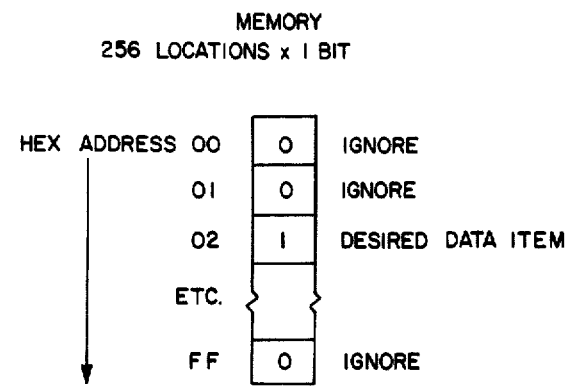
FIG. 12 shows a memory for an alternative embodiment.
Figure 13:
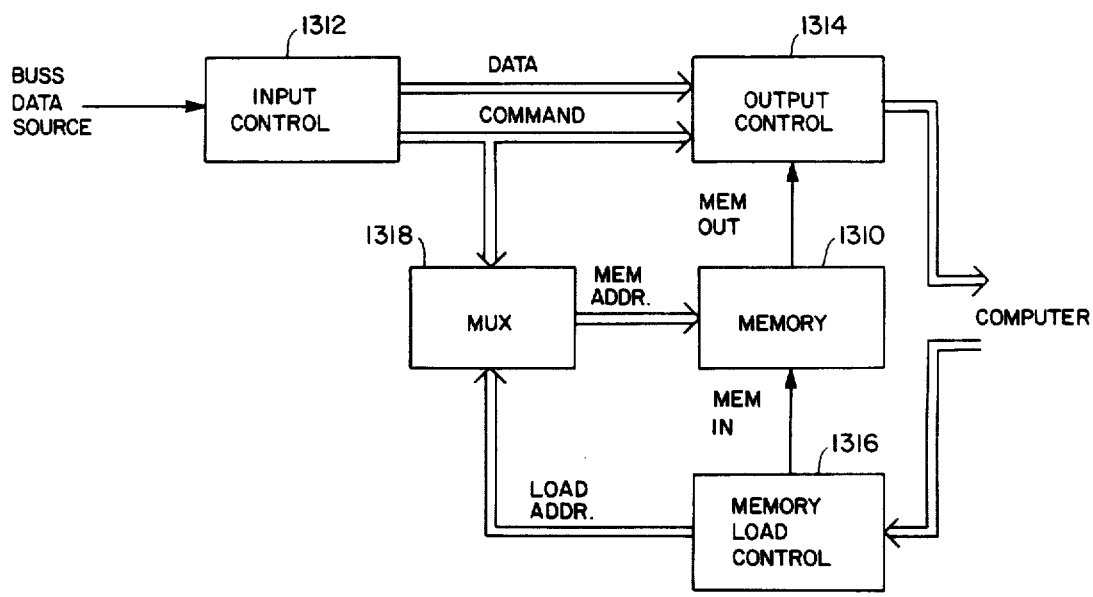
FIG. 13 is block diagram of the alternative embodiment.

A simple alternative embodiment is shown in FIGS. 12 and 13. It may be used with a single buss, particularly the DIGIBUS. In this embodiment also, a data selection circuit is added between a system buss and the reduction and bench computers. This circuit has the capability of selecting any number of desired transfers to send to the computers, and it is configured so identical and repetitive hardware is not required for each desired transfer. This reduces the reduction time required for flight data, plus reduces the hardware and increases the capability of the test bench.

This is accomplished by using a single bit selection memory whose length is equal to the possible number of commands, as shown in FIG. 12. The command portion of the data transfer is allowed to address the memory, and if it contains a "one" the command and data is transferred to the computer, otherwise is is ignored. This method allows complete flexibility as any desired situation can be handled. It can also be easily expanded should the number of command bits increase.

A block diagram is shown in FIG. 13. The buss interface comprises an input control circuit 1312 and an output control circuit 1314. The single bit memory 1310 controls the selection of data to be supplied from the buss to the computer. The loading of the memory is performed prior to processing and is best accomplished by transferring 16 words of 16 bits each from the computer to the selection circuitry, with each bit being used for one of the commands. This keeps the loading process to the practical minimum, plus provides a fixed format thus reducing control functions. This is done via the memory load control circuit 1316. The address is supplied to from the computer via the memory load

| CMD CNT | | | -DTACNT- | CC- | - | CMD CNT | | | | - | DATA CNT | | | |
|---|---|---|---|---|---|---|---|---|---|---|---|---|---|---|
| - 64- | 32- | 16- 32- | 32-128- | S- | 8- | 4- | 2- | 1- | 16- | 8- | 4- | 2- | 1- |
| - 15- | 14- | 13- 12- | 11- 10- | 09- | 08- | 07- | 06- | 05- | 04- | 03- | 02- | 01- | 00- |

Note, S- is defined as not status word. This allows the command word to contain a data count of zero, and each data word (1 to 32) to contain the command count of the associated message. If the status word follows the control circuit 1316 and a multiplex circuit 1318 to the memory. The single bit to be written in the memory for yes or no from the computer is supplied directly from the memory load control circuit 1316 to the memory.

During run, the memory address is taken from the command word as determined by the input control circuit 1312, and supplied via the multiplex circuit 1318 to the memory 1310. The memory output is used to select transfers to send to the output control circuit 1314.

It is thought that the selection of data from busses for test having the improvements of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely an exemplary embodiment thereof.

I claim:

1. Data selection apparatus for obtaining data items from a system having a plurality of system busses and supplying it to a test computer or manual test means, wherein information from the buss is supplied in successive transfers, with each transfer comprising a command word as a header followed by a number of data items, said data selection apparatus comprising:

individual to each system buss, a buss interface unit coupling to the system buss and includes input control means and a buffer memory, an intermediate interface unit, a direct memory access module, and a data select unit, input/output data transmission means coupled between the intermediate interface unit and the direct memory access module, control signal transmission means coupled between the intermediate interface unit and the direct memory access module, select data transmission means coupled between buffer memory of the buss interface unit and the intermediate interface unit for supplying data selected from the buss which is forwarded via the input/output data transmission means to the direct memory access module, a load data line coupled from the intermediate interface unit to the data select unit for supplying load data to the data select unit, a data select line coupled between the intermediate interface unit and the data select unit for supplying control signals to and status signals from the data select unit, and select code and signal lines coupled from the input control means of the buss interface unit to the data select unit, and an in clock lead from the data select unit to the buffer memory of the buss interface unit;

a common buss interconnecting the test computer with the direct access memory modules of all of the busses, manual control and data lines connecting the manual test means in common to the intermediate interface units of the system busses;

wherein each data select unit comprises a selection memory, a position counter, a position memory, mode control means, a command select store, a position word counter, a position word shift register, a select store, load control means, and run control means having a clock generator;

with the mode control means comprising standby mode means, load mode means including a load bistable device, and run mode means including a run bistable device, mode command signals being supplied to the mode control means via said data select line from the intermediate interface unit, the mode command signals being originated either from the test computer via the direct access memory module or from the manual test means, the mode command signals including a standby command to place the unit in the standby mode, a load command coupled to set the load bistable device, and a run command coupled to set the run bistable device and thereby cause the load bistable device to be reset, the standby mode being effective with both the load and run bistable devices reset, the load mode being effective with the load bistable device set and the run bistable device reset, and the run mode being effective with the run bistable device set and the load bistable device reset;

the load control means being coupled to the mode control means to be effective during the load mode, which enables the command select store and position word counter to load first a buss select word from the load data line into the command select store and the position word counter, transferring the data from the command select store into the selection memory, and then to load a position word from the load data line into the position word shift register when the position word counter has a nonzero positive value;

the run control means being effective during the run mode to receive signals from the buss interface unit via the select code and signal lines to operate the clock generator, to transfer the command word from a particular transfer to the select store, means coupling to the selection memory and the position memory to first check the command word to determine if any data items are desired from the particular transfer, and if they are to check the position of each data item to determine if it is desired, means coupling to the checking means to enable pulses to be supplied from the clock generator to the in clock lead of the buss interface unit to load the desired data items received on the system bus into the buffer memory for forwarding to the direct memory access module.

2. Data selection apparatus according to claim 1, wherein said load control means provides for programming of the data select unit to be performed using two select words, the first select word being a command select word which selects the desired command and stores in its location of the selection memory enable, ALL, Interrupt and position address information, a set of bits designated NO. POS WDS. is simultaneously stored in the position word counter whereby said NO. POS. WDS. being a count of the number of position words to be transferred for the particular command select, enable being set only if ALL is set or the number of words designated by NO. POS WDS. is greater than zero, the position address being a relative count determined by the data select unit, the second select word being a plurality of said position words indicated by the NO. POS. WDS. whereby said position words are stored in the position memory, each position word containing yes/no information for M words starting with the command word, after each of said plurality position words is received and loaded, the next select word being transferred and the sequence repeated until the data select is completely loaded as required.

3. Data selection apparatus according to claim 2, in which during the run mode, the sequence after receiving the command word, is to use the command word as stored in the select store to address the selection memory, with signals on enable and ALL leads being supplied and the position counter being loaded per the stored information from the selection memory, it being required that the signal on the enable lead be true to transfer any data item, if the signal on the ALL lead is true all data items until the next command word being transferred, a yes/no bit from the position memory being read and used when the signal in the ALL lead is not true to determine whether to transfer said each data item or not, the data item being now transferred if required, if a data item is received next, the position counter being incremented and the new yes/no bit being read from the position memory.

4. Data selection apparatus according to claim 2, wherein said position memory has two sections, one section having N times M addresses with one bit at each address for said yes/no information, and the other section has N addresses with one bit at each address for STOP information, the STOP bit being used during the run mode to stop the selection of further data, the position storage being divided in M word groups; and wherein said selection memory also has N addresses, N and M being integers greater than one.

5. Data selection apparatus according to claim 4, wherein the interrupt bit indicates if the computer desires an interrupt along with the selected command for timing or synchronization, said data select unit having means to output the interrupt bit during the run mode for use by the computer.

6. Data selection apparatus for obtaining data items from a system having at least one buss and supplying it to a test computer, wherein information from the buss is supplied in successive transfers, with each transfer comprising a command word as a header followed by a number of data words, said data selection apparatus comprising:
- a buss interface unit coupling to the system buss and includes input control means and a buffer memory, an intermediate interface unit, access means coupling the intermediate interface unit to the test computer, and a data select unit, select data transmission means coupled between buffer memory of the buss interface unit and the intermediate interface unit for supplying data selected from the system buss which is forwarded via the access means to the test computer, a load data line coupled from the intermediate interface unit to the data select unit for supplying load data to the data select unit, a data select line coupled between the intermediate interface unit and the data select unit for supplying control signals to and status signals from the data select unit, and select code and signal lines coupled from the input control means of the buss interface unit to the data select unit, and an in clock lead from the data select unit to the buffer memory of the buss interface unit;
- wherein said data select unit comprises a clock generator, a selection memory, a position counter, a position memory, mode control means, a command select store, a position word counter, a position word shift register, and a select store;
- with the mode control means comprising means to provide a standby mode, a load mode, and a run mode, mode command signals being supplied to the mode control means via said data select line from the intermediate interface unit, the mode command signals being originated from the test computer via the access means, the mode command signals including a standby command to place the unit in the standby mode, a load command coupled to set the mode control means to the load mode, and a run command coupled to set the mode control means to the run mode;
- the data select unit being effective during the load mode, to enable the command select store and position word counter to load first a buss select word from the load data line into the command select store and the position word counter, transferring the data from the command select store into the selection memory, and then to load a position word from the load data line into the position word shift register when the position word counter has a non-zero positive value;
- the data select unit being effective during the run mode to receive signals from the buss interface unit via the select code and signal lines to transfer the command word from a particular transfer to the select store, means coupling to the selection memory and the position memory to first check the command word to determine if any data items are desired from the particular transfer, and if they are to check the position of each data item to determine if it is desired, means coupling to said checking means to enable pulses to be supplied from the clock generator to the in clock lead of the buss interface unit to load the desired data items received on the system buss into the buffer memory for forwarding to the test computer via the access means.

7. Data selection apparatus according to claim 6, which is universal to a plurality of busses having different data formats, with each buss having individual thereto one set of apparatus comprising a buss interface unit, an intermediate interface unit, access means coupling the intermediate interface unit to the test computer, and a data select unit.

8. Data selection apparatus for obtaining data words from a system having at least one buss and supplying it to a test computer, wherein information from the buss is supplied in successive transfers, with each transfer comprising a command word as a header followed by a number of data words, said data selection apparatus comprising:
- a buss interface unit which includes input control means coupled to said buss, and output control means coupled to the input control means;
- a data select unit which comprises a position memory having a number of words of one bit each for yes/no information, mode control means, memory load control means, and address means having inputs from the memory load control means and the input control means, and output to the position memory;
- data transmission means coupled between the output control means and the test computer, and load data transmission means coupled between the test computer and the memory load control means for supplying load data including address information to the data select unit;
- with the mode control means comprising means to provide a load mode and a run mode;
- the data select unit being effective during the load mode to receive information from the test computer via the load data transmission means to the memory load control means, and to use that information to supply addresses from the memory load control means via the address means to the position memory, and to supply data comprising a single bit for each word from the memory load control means to the position memory for storage therein, to thereby load the yes/no information from the computer into the position memory prior to processing;

the data select unit being effective during the run mode for each said transfer to receive an address derived from said command word from the input control means and supply it via the address means to the position memory, to read the single bit per word from the position memory to the output control means, and wherein the output control means uses the single bit to select whether or not each data word of the transfer is supplied to the test computer, the output control circuit being enabled in response to the output being "yes" to select a data word received from the buss and to transfer it via the transmission means to the computer, with the data word not being transferred in response to the memory output being "no".

* * * * *